US010005480B2

(12) United States Patent
Grappe

(10) Patent No.: US 10,005,480 B2
(45) Date of Patent: Jun. 26, 2018

(54) STORE, MOVE, AND USE DEVICE

(71) Applicant: James Daniel Grappe, Austin, TX (US)

(72) Inventor: James Daniel Grappe, Austin, TX (US)

( * ) Notice: Subject to any disclaimer, the term of this patent is extended or adjusted under 35 U.S.C. 154(b) by 49 days.

(21) Appl. No.: 15/047,931

(22) Filed: Feb. 19, 2016

(65) Prior Publication Data

US 2016/0244079 A1 Aug. 25, 2016

Related U.S. Application Data

(60) Provisional application No. 62/118,269, filed on Feb. 19, 2015.

(51) Int. Cl.
*B62B 1/12* (2006.01)
*A47B 31/00* (2006.01)
*A47B 85/06* (2006.01)

(52) U.S. Cl.
CPC ............... *B62B 1/12* (2013.01); *A47B 31/00* (2013.01); *A47B 85/06* (2013.01)

(58) Field of Classification Search
USPC ........ 190/11, 18 A, 115, 1, 39; 280/38, 639; 312/241, 313
See application file for complete search history.

(56) References Cited

U.S. PATENT DOCUMENTS

| 380,218 | A | 3/1888 | Rice |
| 1,301,351 | A | 4/1919 | Ackels |
| 1,455,395 | A | 5/1923 | Exum |
| 1,487,569 | A | 3/1924 | Huddle |
| 2,190,498 | A | 2/1940 | Williams |
| 2,411,332 | A | 11/1946 | Orchard |
| 4,195,889 | A | 4/1980 | Coyne |
| 6,213,265 | B1 * | 4/2001 | Wang ....................... A45C 9/00 190/11 |
| 7,901,018 | B2 | 3/2011 | Baughman |
| 8,127,690 | B2 | 3/2012 | Baughman |
| 2014/0137368 | A1 * | 5/2014 | Frame .................... F16B 39/02 16/19 |

* cited by examiner

*Primary Examiner* — John D Walters
*Assistant Examiner* — Hilary L Johns
(74) *Attorney, Agent, or Firm* — Kelly Kordzik; Matheson Keys Daffer & Kordzik PLLC

(57) ABSTRACT

A portable box table that includes a storage body comprising a plurality of sides enclosing a space suitable for storing items therein, and a wheel assembly coupled to the storage body suitable for enabling transportation of the portable box table over a ground surface. A side of the storage body is configured to be detachable from the storage body, wherein the detachable side further includes extendable legs coupled to an underneath surface of the detachable side, wherein the extendable legs are configured to retract in a storage position parallel and adjacent to the underneath surface of the detachable side, and wherein the extendable legs are configured to extend from the storage position to an extended position to support a work surface of the detachable side in a position substantially parallel to the ground surface.

19 Claims, 15 Drawing Sheets

STORE, MOVE, AND USE DEVICE

This application claims priority to U.S. provisional application Ser. No. 62/118,269, which is hereby incorporated by reference herein.

TECHNICAL FIELD

The present disclosure relates to a portable combined table and storage box, and more particularly to a detachable table, which is integrated into the storage box as a door.

BACKGROUND AND SUMMARY

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Currently, there exist portable tables, and portable storage containers, but no elegant solution for both a movable storage container and multiple integrated tables combined in the same unit. There is a need for a portable food and beverage serving station that also has an expandable serving area. There is a need for a bar cart that has a large expandable serving area while also having secure storage for glassware and expensive beverages. There is a need for a valet stand that securely holds keys while also folding up and rolling away at the end of the night. Furthermore, there is a need for a highly secure storage means while traveling. Additionally, there is a need for a large portable work area, for example, for various electronic equipment, such as expensive cameras, laptops, and valuable documents. As a result, there are needs for portable storage solutions that also have integrated or built-in table surfaces.

Embodiments of the present disclosure provide portable box tables, which include a storage container and integrated or built-in table surfaces. Embodiments may include wheels for easy movement of the box table, or other means for movement and/or portability of the portable box table. Herein, the terms "container" and "box" are interchangeably used, but refer to essentially the same type of apparatus.

Embodiments of the present disclosure may be utilized for: a portable BBQ trailer that has table surfaces built-in for food serving; a portable box table with an integrated heating and/or cooling device and/or insulation for the storage container; a food and/or bar cart; safe storage; a portable office; a portable sales kiosk or display stand; a photographer/videographer safe luggage and work station; a portable work station for hair dressers, massage therapists, animal groomers, or realtors; recreational use for campers, cyclists, hikers, gardeners, and general outdoors use; corporate uses for trade shows, temporary offices, or construction sites; airport luggage; a portable work stand for a construction or tradesman such as a carpenter, welder, electrician, plumber, farmer, or hunter; water transportation; military supply deployment and use; emergency services such as the red cross and disaster relief; a disc jockey stand; use for bands and/or concerts; tailgating; and a box table that also serves as a vehicle or trailer.

DETAILED DESCRIPTION

Figure 1:
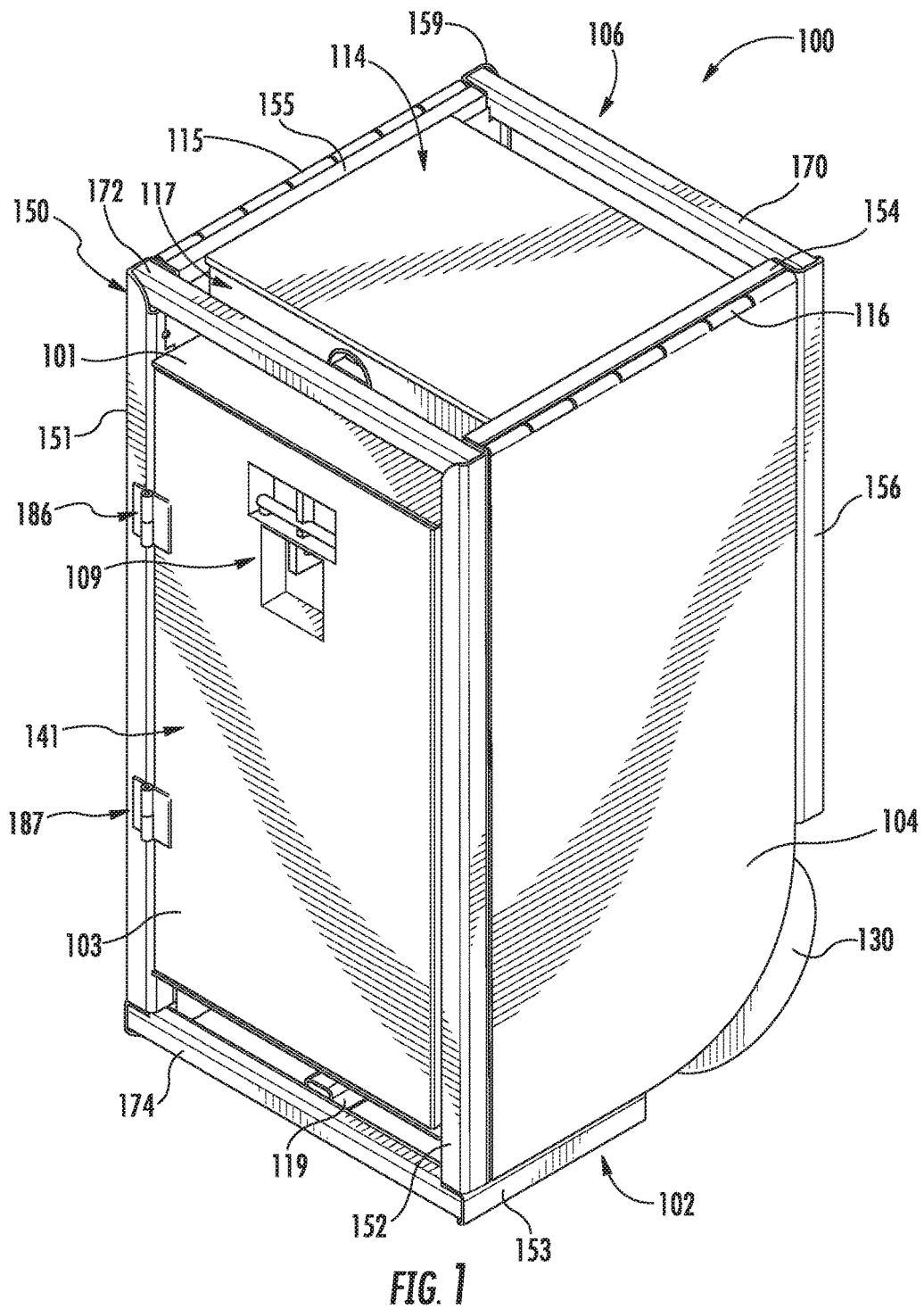
FIG. 1 illustrates embodiments of a portable box table configured in accordance with aspects of the present disclosure.

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description is not intended to limit the scope of the invention, as claimed, but is presented for purposes of illustration only to describe the features and characteristics of the present invention, to set forth the best mode of operation of the invention, and to sufficiently enable one skilled in the art to practice the invention. Accordingly, the scope of the present invention is to be defined solely by the appended claims.

In describing and claiming the present invention, the following terminology will be used.

The singular forms "a," "an," and "the" include plural referents unless the context clearly dictates otherwise.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D. The term "comprising," which is synonymous with "including," "containing," or "characterized by," is inclusive or open-ended and does not exclude additional, unrecited elements or method steps. "Comprising" is a term of art used in claim language which means that the named elements are present, but other elements can be added and still form a construct or method within the scope of the claim.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

In various embodiments of the portable box table disclosed herein and illustrated in the figures, dimensions have not been provided. Nevertheless, such embodiments may be manufactured with any dimensions suitable for the particular use or uses for which the portable box table may be implemented or designed. As a non-limiting example, embodiments of the portable box table may be designed with dimensions so that the portable box table can be carried by a person on a hiking/camping expedition, or as luggage while traveling. Furthermore, the shapes of the various embodiments of the portable box table are not to be limited to the rectangular shapes shown in the figures, but may take on other geometric shapes, including square, pyramidal, octagonal, etc. Furthermore, the edges of the various embodiments of the portable box table may be rounded and/or protected by other materials such as molding pieces.

FIG. 1 illustrates an example of a portable box table 100 configured in accordance with embodiments of the present disclosure. The exemplary portable box table 100 has a storage body 141 with a top side 101, a back side 106, a bottom side 102, and a front side 103. Not shown are the left and right sides (e.g., see 210, 211 of FIG. 2) of the storage body 141, since these are covered in this FIG. 1 illustration by retracted table surfaces (e.g., table surface 104). The storage body 141 of the portable box table 100 may have a hollow inside (e.g., see 220 of FIG. 2), which may be used for storing and/or securing items inside, as further described herein. The front side 103 (or, alternatively, any of the sides of the storage body 141) may include one or more windows (not shown) so that objects inside the portable box table 100 may be viewed from the outside, or for merely a passage of light. A window may be of any size and shape, and may be comprised of any translucent or transparent material (e.g., glass, plastic), or may merely be an opening formed in a side of the storage body 141.

The storage body 141 may be attached in a fixed relationship to a frame 150, comprising elongated members 151-156, 159, 170, 172, 174, and similar elongated members not shown in this view, but shown in some of the other figures. The various elongated members of the frame 150 may be connected in a fixed box-like arrangement. The frame 150 may include an additional member 119 to support the bottom side 102 of the storage body 141.

The embodiments shown in FIG. 1 illustrate an example of two table surfaces (only table surface 104 is visible in this view) secured to the right and left sides (e.g., see 210, 211 of FIG. 2) of the storage body 141, respectively. Note that embodiments of the portable box table may include one or more of such table surfaces (e.g., see also front side 103, which is further described in FIGS. 14-15) coupled to one or more sides of the portable box table 100. These exemplary table surfaces 104, 105 may be detached and/or extended from the storage body 141 of the portable box table 100 for utilization as table or seating surfaces. FIG. 1 illustrates the table surfaces 104, 105 in a "closed" configuration (i.e., retracted to be adjacent the sides of the storage body 141) for those instances when the table surfaces 103, 104, 105 are not being utilized, and thus can be retracted and/or attached to one or more sides of the portable box table 100, such as when the portable box table 100 is being transported or transferred from one location to another.

The table surfaces may be coupled to the portable box table 100 in any suitable manner. In embodiments of the present disclosure, the table surface 104 is coupled to the elongated frame member 154 by hinge 116 so that the table surface 104 can be retracted to the side of the portable box table 100 or extended for use (see, e.g., FIGS. 2-3). The table surfaces may have any appropriate shape. The portable box table 100 may have another extendable table surface (not shown in this view), which is coupled to the elongated frame member 155 by hinge 115 (see, e.g., FIGS. 2-3). Other figures discussed hereinafter will describe how such table surfaces may be extended and/or detached for use.

The front side 103 may be configured to detach or open (e.g., in a door-like manner) from the storage body 141. In such embodiments, the front side 103 may be secured to the storage body 141 by any suitable configuration. In embodiments of the present disclosure, such as exemplified in FIG. 1, the front side 103 may be configured as a door, which is hingeably coupled to the portable box table 100 by one or more hinges (e.g., hinges 186, 187), which may be attached to the storage body 141 or an elongated frame member (e.g., elongated frame member 151). This permits the front side 103 to be opened for access inside the storage body 141 (e.g., see FIG. 2). Any suitable latching and/or locking mechanism (e.g., latch 109) may be utilized to secure the front side 103 in a closed configuration.

The portable box table 100 may also include an optional drawer unit 114 positioned over the storage body 141, with access provided by a pull-out drawer 117. The drawer unit 114 may be attached to the top side 101 of the storage body 141 and/or to any one or more of the elongated frame members (e.g., 154, 155, 170, and/or 172).

As will be described with respect to various configurations hereinafter, embodiments of the portable box table may include one or more wheel assemblies for transporting the portable box table. As an example, a wheel 130 is shown in FIG. 1, with similar and other configurations described with respect to some of the other figures.

The materials that may be used for making embodiments of the portable box table described herein comprise any suitable materials for adequately forming the storage body with an enclosed inside space (e.g., for the storage of items inside), and for the attachment of table surfaces thereto in a sturdy manner so that the table surfaces may be utilized for various uses disclosed herein and other equivalent uses. For example, materials that may be utilized to make embodiments of the portable box table include hardwood, particle board, cloth with sturdy frames (e.g., frame 150) inside or outside to form the enclosed space and/or the table surfaces, metal (e.g., aluminum), fiberglass, plastic, or the like. Since some various potential uses of a portable box table require that the portable box table be easily carried, the materials utilized to make such a portable box table may include those that are lightweight enough, yet sufficiently rigid and strong enough, for storing and securing items inside the portable box table, and for sufficiently supporting items on the table surfaces. The various parts of the portable box table may be coupled to each other using any suitable means, including nails, staples, screws, adhesives, weld joints, bolts, brackets, hinges, or the like.

Figure 2:
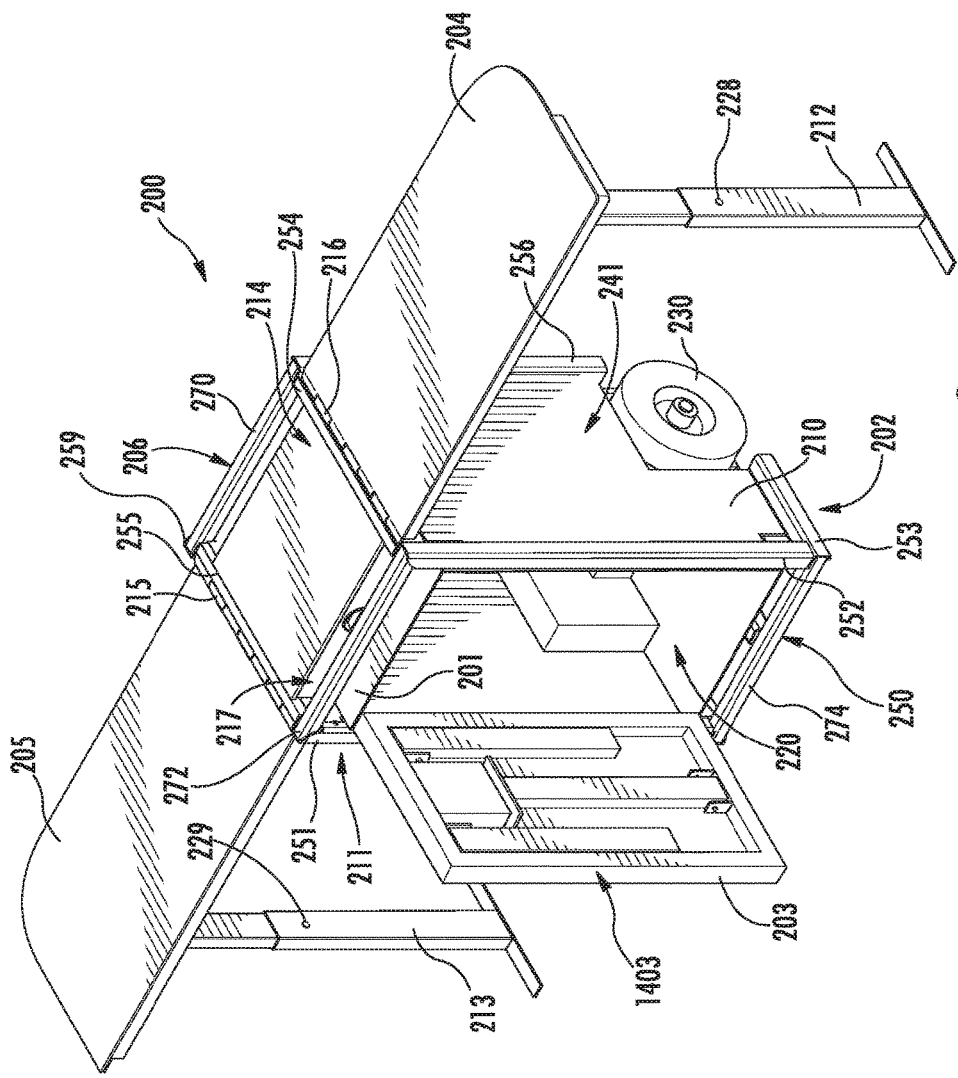
FIG. 2 illustrates embodiments of a portable box table showing extensions of table surfaces.

FIG. 2 illustrates embodiments of a portable box table in accordance with aspects disclosed herein. The exemplary portable box table 200 may be configured in a manner similar to the portable box table 100 previously described with respect to FIG. 1. As such, parts of the portable box table 200 labeled as 201-204, 206, 214-217, 230, 241, 250-256, 259, 270, 272, and 274 may be similarly configured as those corresponding parts of the portable box table 100 labeled as 101-104, 106, 114-117, 130, 141, 150-156, 159, 170, 172, and 174.

FIG. 2 illustrates how an enclosed space within the storage body 241 is formed by the top side 201, the bottom side 202, the front side 203, the back side 206, the right side 210, and the left side 211. FIG. 2 also illustrates how the frame 250 can provide structural support for the storage body 241.

FIG. 2 provides an exemplary illustration for how one of the sides may be opened in order to access the inside storage area 220 of the storage body 241 of the portable box table 200. For example, the front side 203 may be configured as a door to be opened (e.g., in a hinged door-like manner) so that the inside 220 of the storage body 241 of the portable box table 200 may be accessed for storage and/or securing of items inside. Alternatively, the front side 203 may be configured to be a slideable door (not shown). Any well-known means may be implemented within the inside 220 to store and/or secure items, such as shelves, brackets, or the like. Furthermore, the inside 220 may be insulated to retain heat or cold, and/or fitted with a heating and/or cooling apparatus.

The front side 203 may include any suitable hinge-like device(s) and/or handle(s) for permitting the opening and closing of the front side 203. Furthermore, any type of latch and/or locking apparatus may be implemented that is suitable for securing the front side 203 in a closed position with respect to the storage body 241 of the portable box table 200 (e.g., see the latch 109 in FIG. 1).

Figure 14:
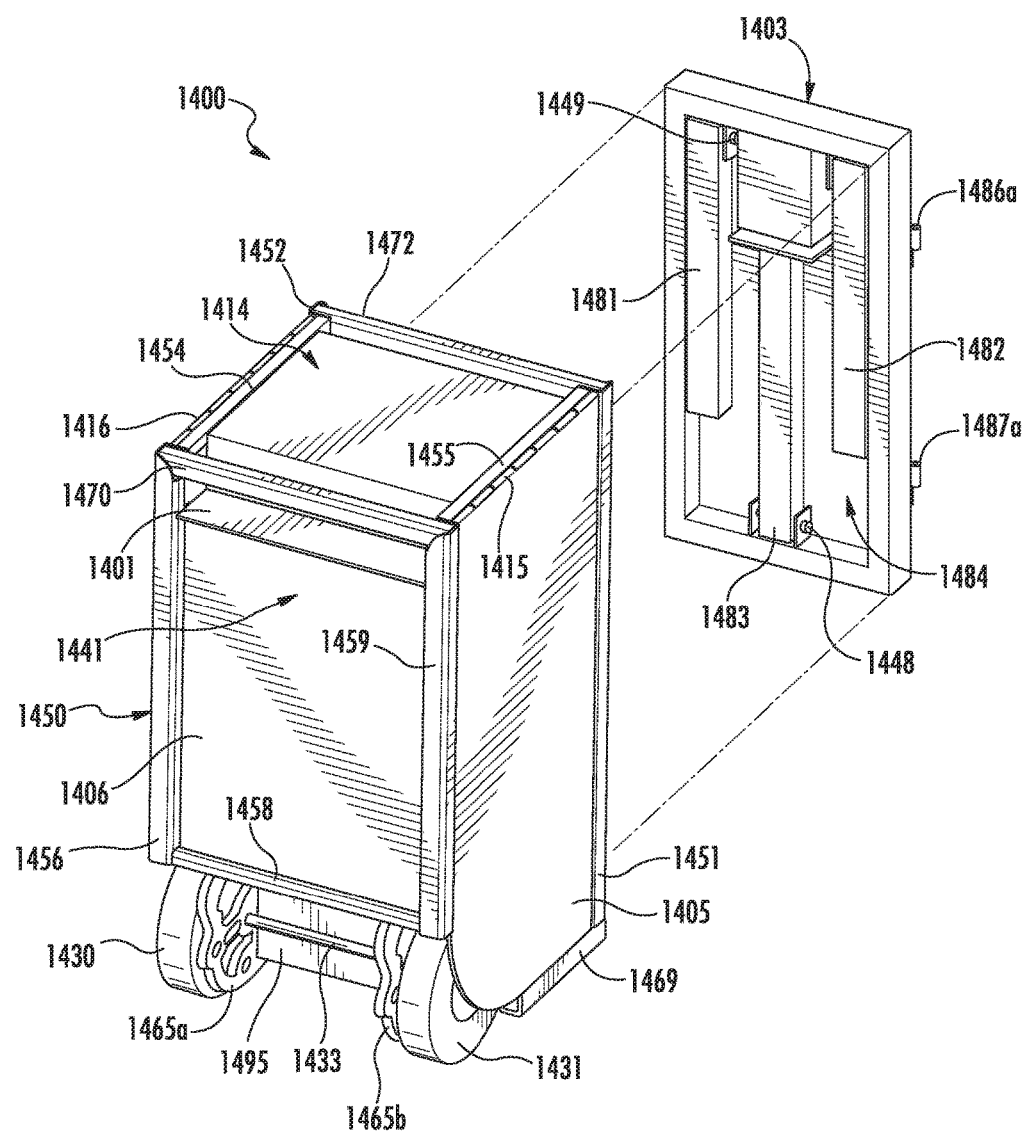
FIGS. 14-15 illustrate embodiments of a portable box table with a detachable table that can serve as a door of the portable box table.
Figure 15:
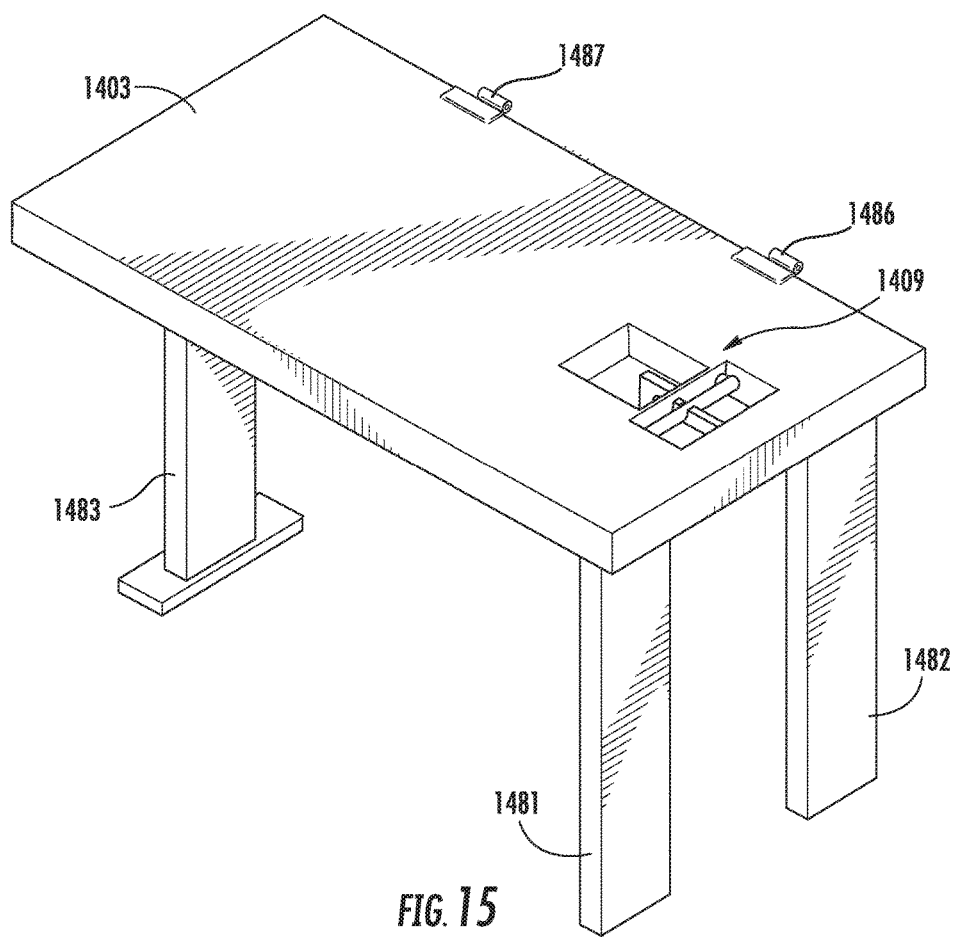

Note that, in embodiments of the present disclosure, the portable box table may have one of the surfaces of its storage body (e.g., the front side) configured to be detachable for use as a table surface, which is further described with respect to FIGS. 14-15.

FIG. 2 also illustrates examples of how the table surfaces 204 and 205 may be erected for use thereby. For example, either or both of the table surfaces 204, 205 may be extended from their retracted positions (e.g., see retracted table surface 104 in FIG. 1). When the table surface 204 is extended as shown in FIG. 2, it is extended from the right side 210 of the storage body 241 of the portable box table 200. Likewise, the table surface 205 is shown extended from the left side 211 of the storage body 241 of the portable box table 200. Furthermore, in various embodiments of the portable box table, the table surfaces 204, 205 may be extended (e.g., pivoted) into working positions through the implementation of hinges 216, 215 that couple edges of the table surfaces 204, 205 to the sides 210, 211, respectively, of the storage body 241 of the portable box table 200, or other connection points, such as the elongated frame members 254, 255, respectively; or, table surfaces may be configured to slide out into extended working positions.

In various embodiments of the portable box table as disclosed herein, an extended table surface may also be further supported by one or more legs, such as shown in the examples of FIG. 2, wherein an example of single legs 212, 213 are depicted supporting the erected table surfaces 204, 205, respectively. Note that any of the table surfaces may be optionally supported by two or more legs instead of one. The legs 212, 213 may be positioned underneath the erected table surfaces 204, 205, or may be attached to bottom sides of the erected table surfaces 204, 205 using any suitable means for doing so. The legs 212, 213 may also be hinged to the underneath surfaces of the table surfaces 204, 205, respectively, so that they fold underneath when the table surfaces 204, 205 are retracted adjacent to the sides 210, 211, respectively, of the storage body 241 of the portable box table 200. For example, if the width of a leg is less than or the same as the depth of an underneath recess of its corresponding table surface, then the leg can be folded into that "recessed" space when the table surface is retracted adjacent to a side of the storage body (e.g., see FIG. 1). An example of the retraction of legs into an underneath recess of a table surface is illustrated with respect to the table surface 1403 in FIGS. 2 and 14.

Alternatively, such legs (e.g., including the legs 212, 213) may be stored within the inside 220 of the portable box table 200 during transportation of the portable box table 200, and removed for use for supporting the table surfaces.

Each one or both of the legs 212, 213 may be configured to have slideable sections so that they can be shortened for storage underneath their respective table surfaces 204, 205 (or inside 220 of the portable box table 200). The slideable sections may be extended in a telescopic manner and locked into place using any suitable means, such as with depressable locking buttons 228, 229, respectively, which "pop" into corresponding holes in the sections to affix the overall length of the slideable sections. Other suitable means for extending, positioning, and locking in place the legs may be utilized.

Figure 3:
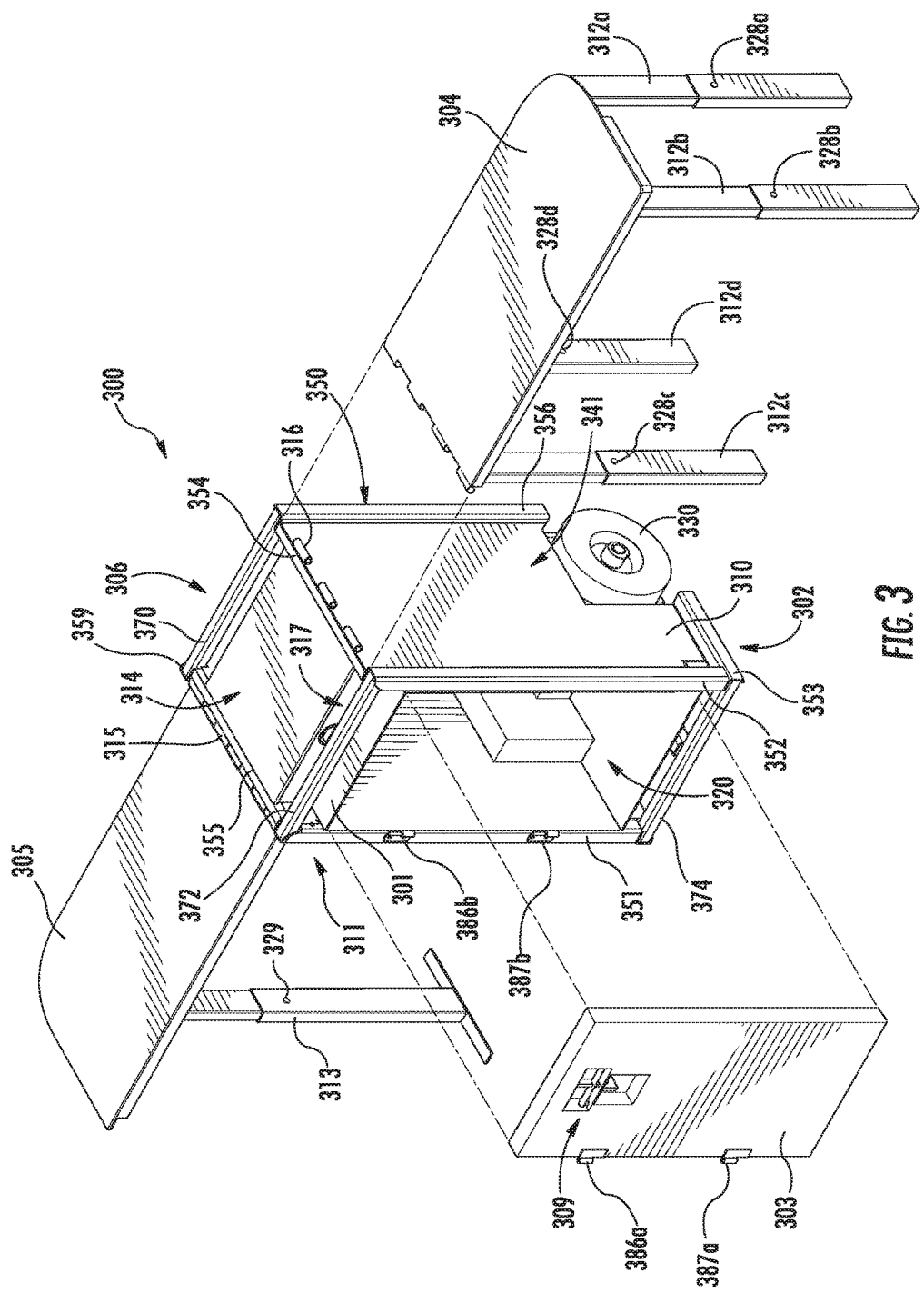
FIG. 3 illustrates embodiments of a portable box table showing a detachment of a table surface.

FIG. 3 illustrates exemplary embodiments of a portable box table as disclosed herein showing how one or more table surfaces may be detached from the storage body of the portable box table. The portable box table 300 may be similarly configured as the portable box tables 100 and 200 previously disclosed. As such, parts of the portable box table labeled as 301-304, 306, 314-317, 330, 341, 350-356, 359, 370, 372, and 374 may be similarly configured as the corresponding parts 101-104, 106, 114-117, 130, 141, 150-156, 159, 170, 172, and 174 of the portable box table 100 and/or the parts 201-204, 206, 214-217, 230, 241, 250-256, 259, 270, 272, and 274 of the portable box table 200. Furthermore, parts labeled as 305, 310-313, 320, 328, and 329 for the portable box table 300 may be similarly configured as the parts labeled as 205, 210-213, 220, 228, and 229 previously described for the portable box table 200 in FIG. 2. The latch 309 may be similarly configured as the latch 109.

Embodiments of the portable box table shown in FIG. 3 also provide an example of how a door may be detachable from the storage body of the portable box table. In this example, the front side 303 may be detached from the front of the portable box table 300 so that the inside 320 is accessible. Moreover, such a detachable front side 303 may then be used as another work surface, such as a table surface or as a sitting surface (e.g., including shorter attachable or extendable legs in order to configure such a surface as a table/stool (e.g., see FIGS. 14-15)). Naturally, any of the working surfaces disclosed herein may be utilized for sitting or standing upon.

An exemplary configuration for detaching the front side 303 from the storage body 341 utilizes one or more hinges with separable male and female parts. For example, the male hinge parts 386b, 387b of such hinges may be affixed to the storage body 341 or the elongated frame member 351 (or the frame member 352), while the female hinge parts 386a, 387a of such hinges are affixed to the front side 303. Essentially, the front side 303 is coupled to the portable box table 300 when the front side 303 is positioned so that the female hinge parts 386a, 387a receive the pins of the male hinge parts 386b, 387b, respectively. The front side 303 can then rotate upon the hinges in a door-like manner, since the female hinge parts are able to pivot/rotate upon the pins of the male hinge parts. The front side 303 can be detached by opening the front side 303 and lifting the front side 303 so that the female hinge parts 386a, 387a slide off of the pins of the respective male hinge parts 386b, 387b.

Additionally, the exemplary table box 300 illustrated in FIG. 3 shows how a table surface (e.g., 304) on the portable box table 300 may be detachable from the storage body 341 of the portable box table 300, as opposed to remaining coupled in a pivoting or hinge-like manner, as shown in FIG. 2. In such instances, multiple legs 312a, 312b, 312c, 312d may be utilized to support the table surface 304. The legs 312a, 312b, 312c, 312d may be stored in the inside 320 of the portable box table 300 (e.g., during transportation of the portable box table 300). The legs 312a, 312b, 312c, 312d may be similar configured to be slideably extendable, such as with legs 212, 213, and 313, and also include depressable locking buttons 328a, 328b, 328c, 328d, respectively. Any suitable means for coupling and uncoupling the detachable table surface 304 from the portable box table 300 may be utilized. For example, a pin (not shown) for coupling together the two halves of the hinge 316 may be removed in order to detach the table surface 304 from the portable box table 300.

Figure 4:
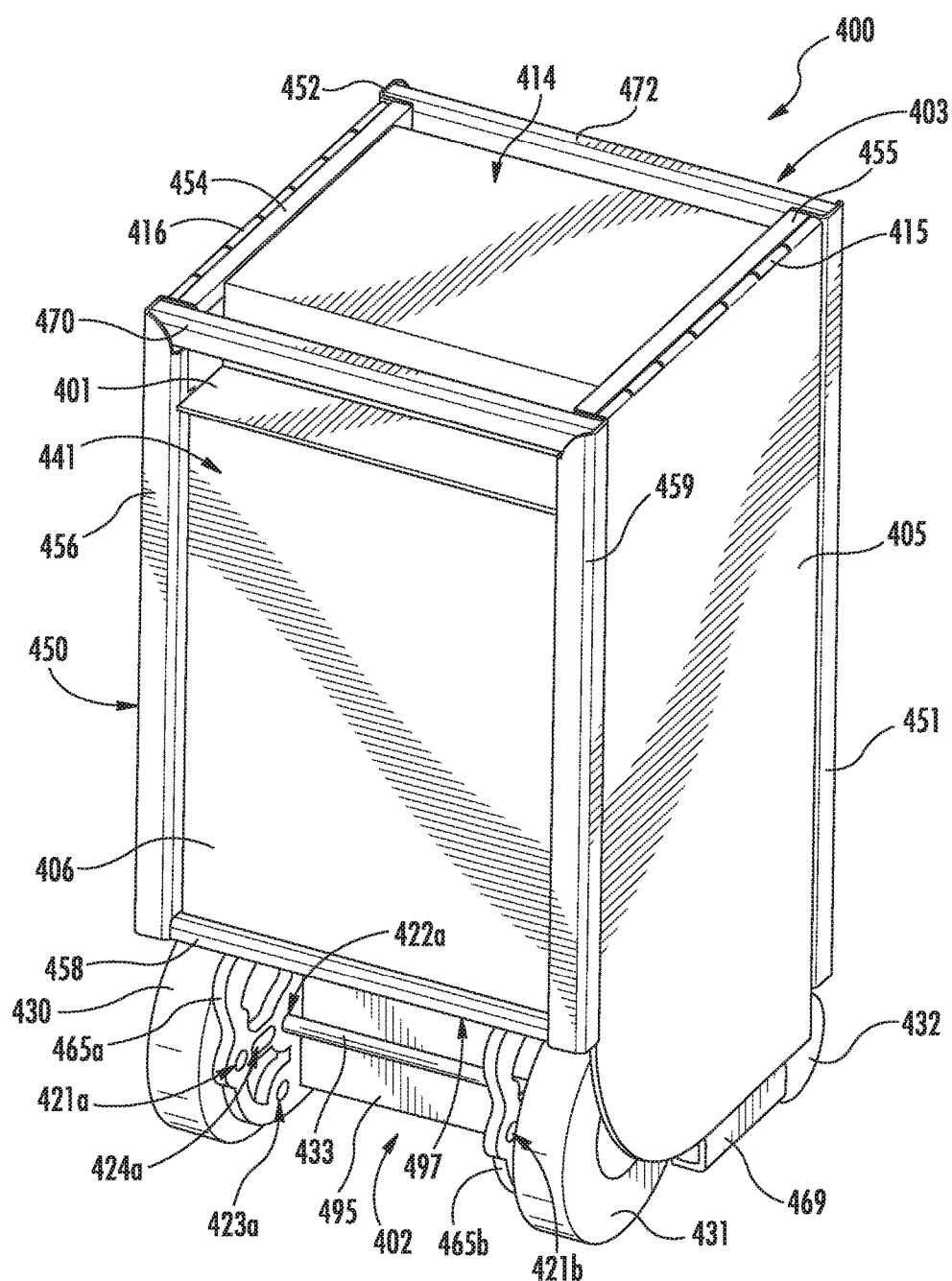
FIG. 4 illustrates embodiments of a portable box table with adjustable wheels.

FIG. 4 illustrates further exemplary embodiments of a portable box table, which embodiments include adjustable wheels for movement and transportation of the portable box table. The exemplary portable box table 400 may be configured in a manner similar to the portable box tables 100, 200, and/or 300. As such, parts of the portable box table 400 labeled as 401-403, 406, 414-416, 430, 441, 450-452, 454-456, 459, 470, and 472 may be similarly configured as those corresponding parts of the portable box table 100 labeled as 101-103, 106, 114-116, 130, 141, 150-152, 154-156, 159, 170, and 172. Likewise, parts of the portable box table 400 labeled as 401-403, 405-406, 414-416, 430, 441, 450-452, 454-456, 459, 470, and 472 may be similarly configured as those corresponding parts of the portable box table 200 labeled as 201-203, 205-206, 214-216, 230, 241, 250-252, 254-256, 259, 270, and 272. Likewise, parts of the portable box table 400 labeled as 401-403, 405-406, 414-416, 430, 441, 450-452, 454-456, 459, 470, and 472 may be similarly configured as those corresponding parts of the portable box table 300 labeled as 301-303, 305-306, 314-316, 330, 341, 350-352, 354-356, 359, 370, and 372.

The portable box table 400 illustrated in FIG. 4 shows various exemplary configurations in which wheels 430, 431, and/or 432 may be coupled to the portable box table 400. For example, wheels 430, 431 may be coupled to the portable box table 400 in a configuration as shown. Nevertheless, any type of axle arrangement whereby wheels 430, 431 may be coupled to the portable box table 400 may be utilized, including, but not limited to wheel configurations in which the wheels pivot outward into a working arrangement from a retracted position (e.g., underneath the bottom side 402 or from underneath the side 497).

In embodiments of the present disclosure, a portable box table may be configured with one or more adjustable wheel assemblies whereby a relative position of a pair of wheels 430, 431 with respect to the remainder of the portable box table 400 is adjustable. As an example, a pair of wheel tabs 465a, 465b are connected to the portable box table 400 in a fixed relationship. The pair of wheel tabs 465a, 465b have corresponding and matching holes, each of which may accept insertion of the axle 433 therethrough. In the example illustrated in FIG. 4, the axle 433 has been inserted through hole 422a within wheel tab 465a and a corresponding hole in wheel tab 465b, which is not shown but is understood to be present. Positioning of the axle 433 within this pair of holes of the wheel tabs 465a, 465b positions the wheels 430, 431 in a closer proximity towards the side 495 of the portable box table 400. Naturally, with respect to this configuration, and all other configurations for coupling wheels to a portable box table, any well-known means for coupling wheels to an axle may be utilized, such as the use of cotter pins.

Figure 13:
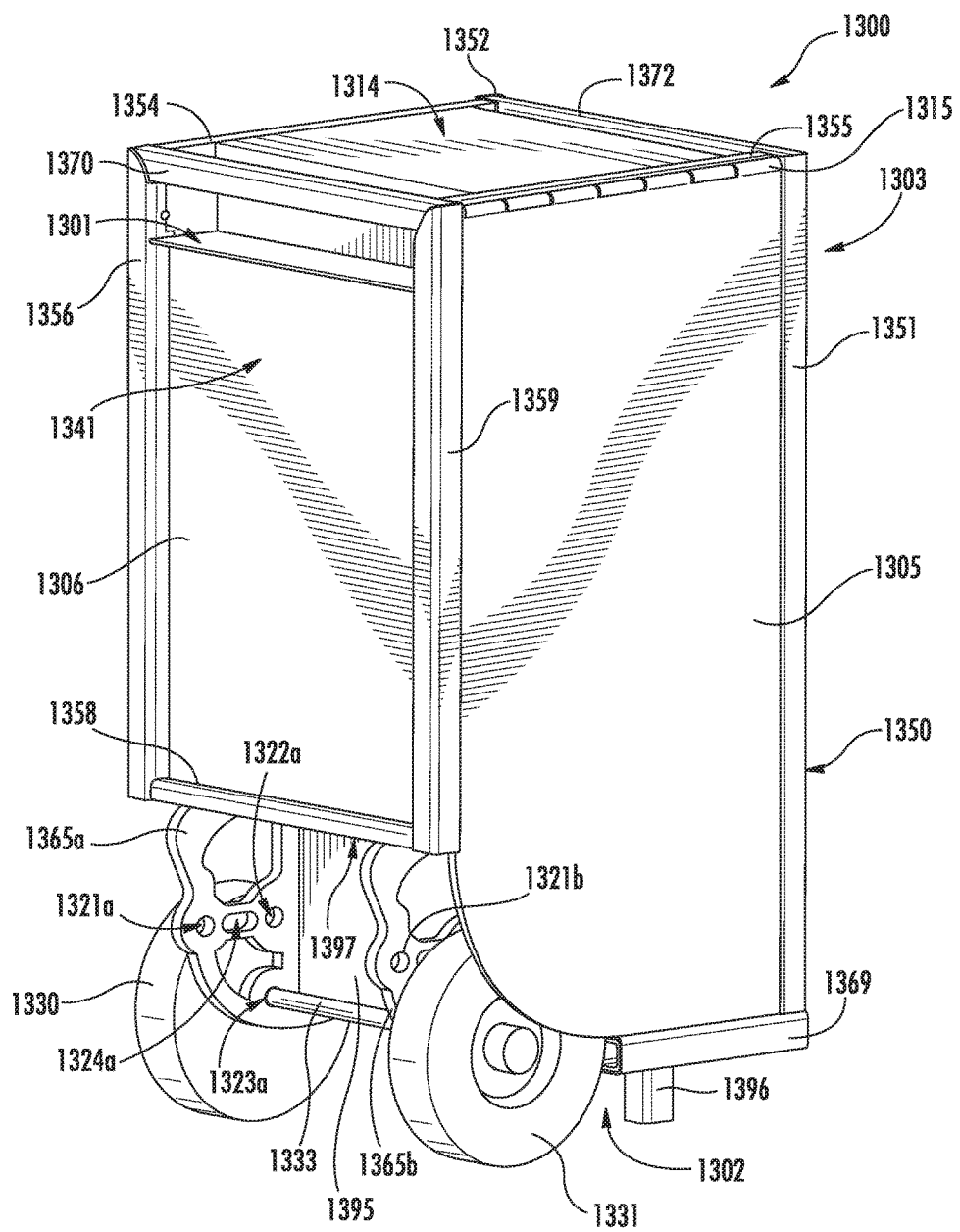
FIG. 13 illustrates embodiments of a portable box table showing examples of adjustable wheel assemblies.

There may be situations where the wheels 430, 431 need to be positioned further away from the body of the portable box table 400, such as for transportation of the portable box table over rough or uneven terrain. In such instances, the axle 433, and correspondingly the wheels 430, 431, may be positioned by inserting the axle 433 through the corresponding holes 421a, 421b. As can be seen, this would position the wheels 430, 431 further away from the side 495. An example of a positioning of the wheels and the axle in one of the other holes within the wheel tabs is illustrated in FIG. 13, described hereinafter.

Alternatively, the axle 433 may be inserted through the hole 423a within the wheel tab 465a and its corresponding hole (not shown) in the wheel tab 465b so that the wheels 430, 431 are positioned further away from the side 497 of the portable box table 400, which can accomplish the task of providing more clearance between the bottom side 402 and a surface, such as a ground surface. Another pair of optional axle holes, configured in an oval-like shape, may be utilized within the wheel tabs 465a, 465b. An example is illustrated in FIG. 4 as hole 424a within wheel tab 465a, which will naturally have a corresponding hole within wheel tab 465b. Such an oval-shaped axle hole would allow lateral movement of the axle 433 for various reasons, including providing for a dynamic repositioning of the wheels 430, 431 in relationship to the body of the portable box table 400 during transportation. Note that the wheel tabs 465a, 465b may implement any desired number or arrangement of such holes.

FIG. 4 also shows another optional exemplary arrangement whereby one or more wheels 432 may be integrated with the portable box table body 441 or frame 450. An axle is not illustrated for reasons of simplicity. It should be further noted that the exemplary portable box table 400 illustrated in FIG. 4 shows that when certain sized wheels 430, 431 are implemented, a cut-out portion may be formed in the storage body 441 of the portable box table 400 (e.g., formed with the sides 495 and 497) in order that the wheels 430, 431 do not extend beyond the sides 404, 405, and/or side 406 of the storage body 441 of the portable box table 400. Naturally, in an alternative arrangement not illustrated, the storage body of the portable box table may remain with a substantially block rectangular form, with the wheels coupled to the portable box table outside of one or more of the outside surfaces of the storage body of the portable box table. The portable box table 400 may be transported on only the wheels 430, 431, or on all the wheels 430 . . . 432.

Figure 5:
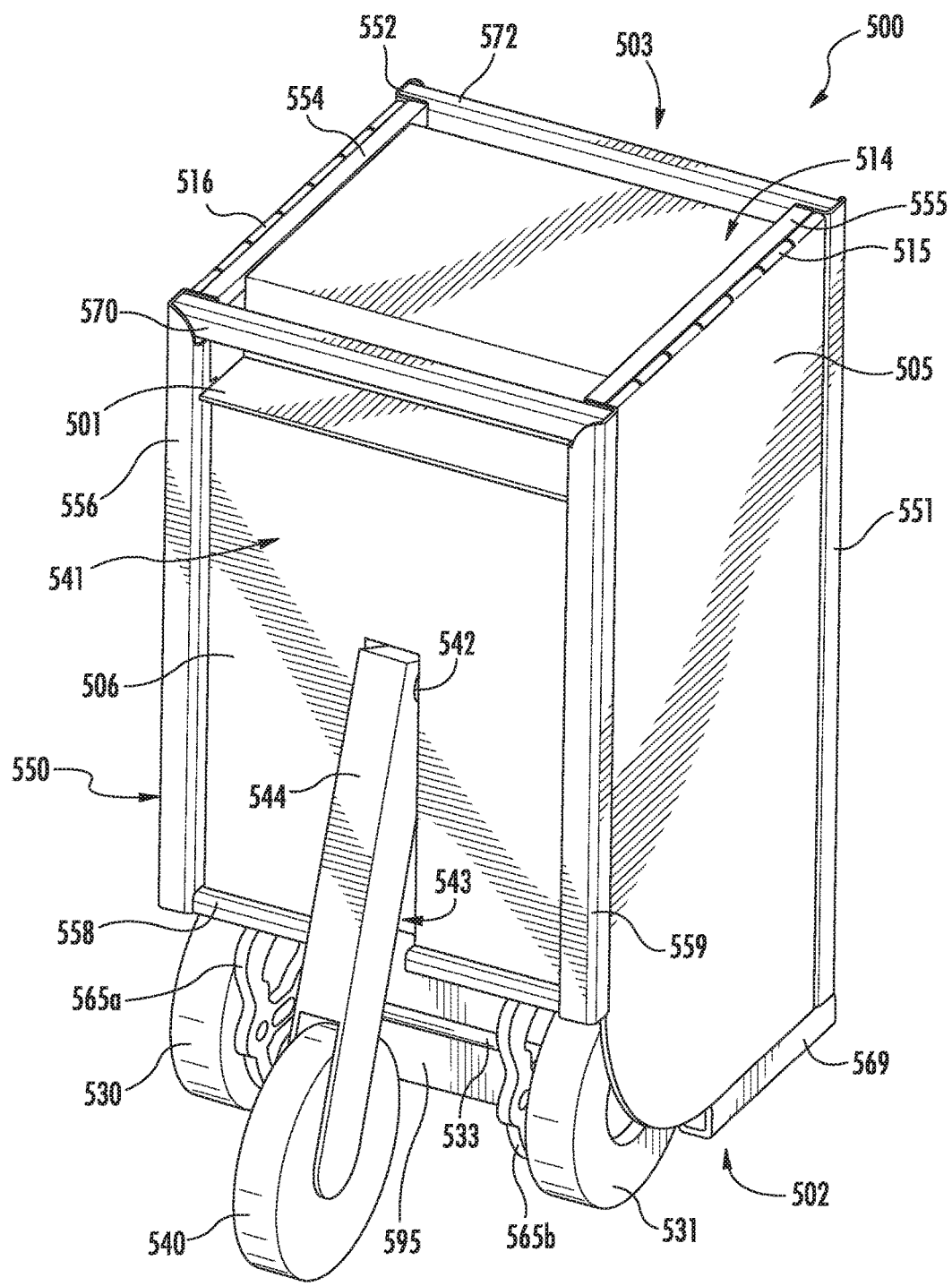
FIG. 5 illustrates embodiments of a portable box table showing alternative arrangements of wheels.

FIG. 5 illustrates a portable box table 500 showing other various exemplary arrangements for coupling wheels to the portable box table 500. The exemplary portable box table 500 may be configured in a manner similar to the portable box tables 100, 200, 300, and/or 400. As such, parts of the portable box table 500 labeled as 501-503, 506, 514-516, 530, 541, 550-552, 554-556, 559, 570, and 572 may be similarly configured as those corresponding parts of the portable box table 100 labeled as 101-103, 106, 114-116, 130, 141, 150-152, 154-156, 159, 170, and 172; parts of the portable box table 500 labeled as 501-503, 505-506, 514-516, 530, 541, 550-552, 554-556, 559, 570, and 572 may be similarly configured as those corresponding parts of the portable box table 200 labeled as 201-203, 205-206, 214-216, 230, 241, 250-252, 254-256, 259, 270, and 272; parts of the portable box table 500 labeled as 501-503, 505-506, 514-516, 530, 541, 550-552, 554-556, 559, 570, and 572 may be similarly configured as those corresponding parts of the portable box table 300 labeled as 301-303, 305-306, 314-316, 330, 341, 350-352, 354-356, 359, 370, and 372; and, parts of the portable box table 500 labeled as 501-503, 505-506, 514-516, 530-531, 533, 541, 550-552, 554-556, 558-559, 565*a*-565*b*, 569-570, 572, and 595 may be similarly configured as those corresponding parts of the portable box table 400 labeled as 401-403, 405-406, 414-416, 430-431, 433, 441, 450-452, 454-456, 458-459, 465*a*-465*b*, 469-470, 472, and 495.

The portable box table 500 further shows how an extendable wheel assembly may be implemented on a side of the storage body of a portable box table. In this example, a wheel 540 is rotatably coupled to an extendable axle member 544 coupled in a pivoting manner to the side 506 of the portable box table 500. FIG. 5 shows the extension of this wheel assembly 540, 544 pivoted away from an outside surface of the side 506 by a pivoting of the wheel assembly 540, 544 with an axle 542 that maintains a pivoting connection between the axle member 544 and the side 506. When the portable box table 500 is not configured for transportation, the wheel assembly 540, 544 may be retracted so that the axle member 544 is positioned into the slot 543 within the side 506 of the portable box table 500. Embodiments of the present disclosure may implement the portable box table 500 without the wheels 530, 531, and the corresponding wheel tabs 565*a*, 565*b*, and axle 533.

Figure 6:
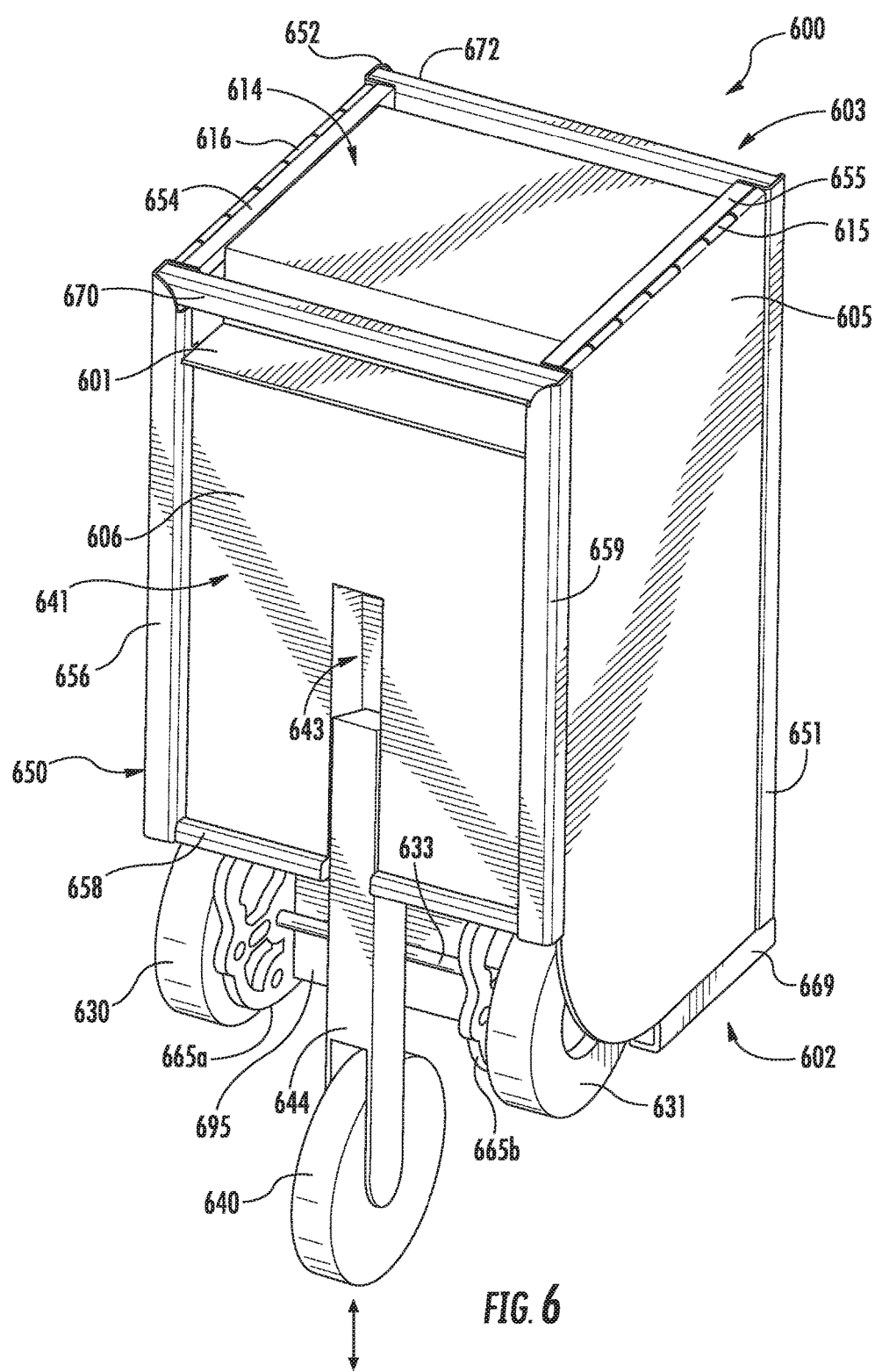
FIG. 6 illustrates embodiments of a portable box table showing alternative configurations with wheels.

FIG. 6 illustrates a portable box table 600, which may be similarly configured as the portable box table 500, with the parts labeled as 601-603, 605-606, 614-616, 630-631, 633, 640-641, 643-644, 650-652, 654-656, 658-659, 665*a*-665*b*, 669-670, 672, and 695 being configured in a similar manner as the parts 501-503, 505-506, 514-516, 530-531, 533, 540-541, 543-544, 550-552, 554-556, 558-559, 565*a*-565*b*, 569-570, 572, and 595 of the portable box table 500 shown in FIG. 5. In the exemplary configuration illustrated in FIG. 6, instead of the wheel assembly 640, 644 pivoting outward from the side 606 of the portable box table 600, the wheel assembly 640, 644 may be extended in a longitudinal manner (as depicted by the double-headed arrow) by extending the axle assembly 644 by means of the slot 643 in the side 606. Though the exact mechanism for maintaining a coupling of the axle assembly 644 to the side 606 of the portable box table 600 is not shown, any type of pin and slot or other type of axle assembly may be utilized that would perform the function shown and described herein. Embodiments of the present disclosure may implement the portable box table 600 without the wheels 630, 631, and the corresponding wheel tabs 665*a*, 665*b*, and axle 633.

It should be noted that embodiments of portable box tables that are within a scope of the exemplary embodiments disclosed herein may include implementations of the wheels 540 and/or 640 without the other wheels shown in these figures. For example, the portable box table 500 may be implemented with only the wheel 540 and without the wheels 530, 531. Likewise, the portable box table 600 may be implemented with only the wheel 640 and not the wheels 630-631, or with any other wheel configuration disclosed herein.

Figure 7:
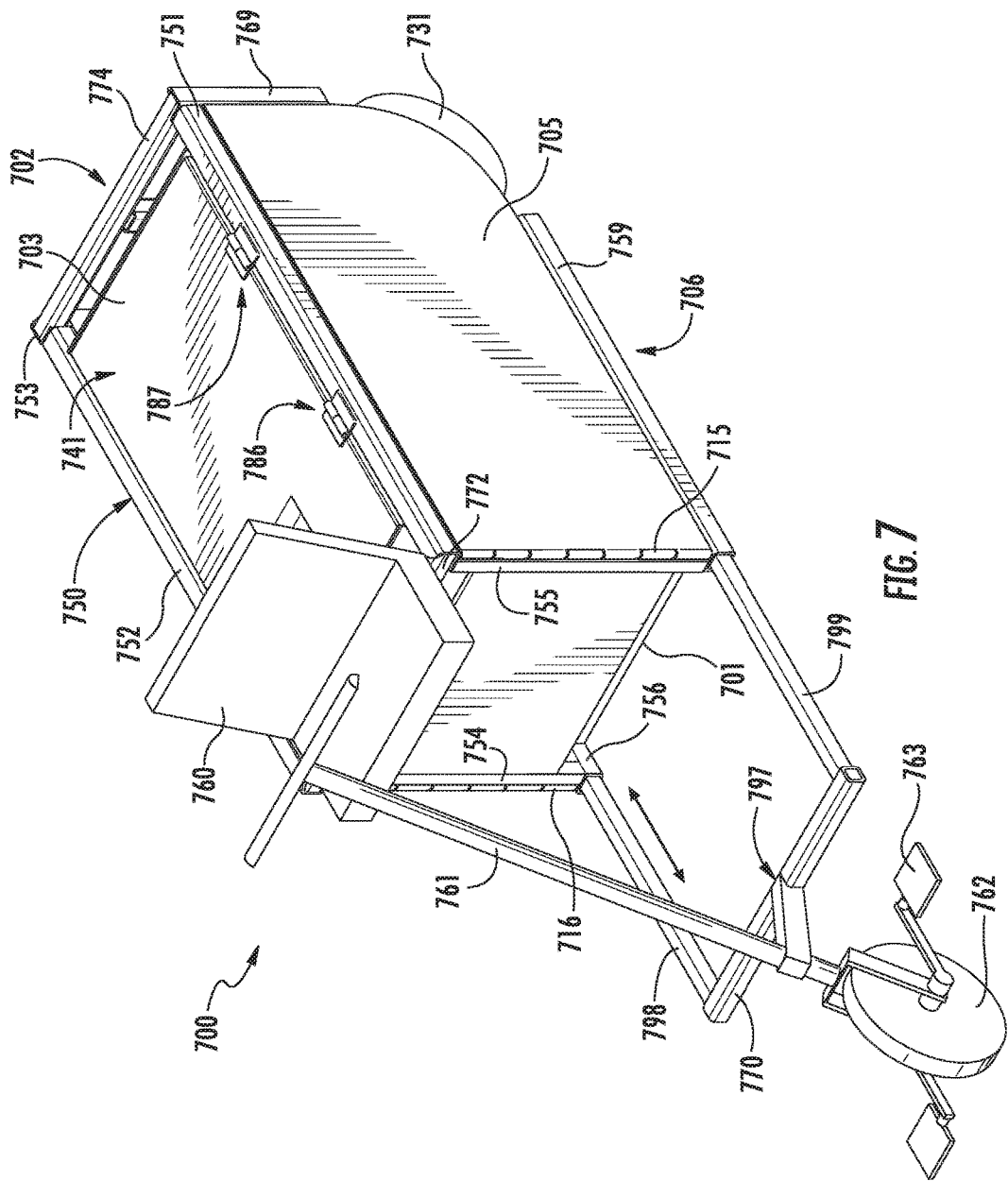
FIG. 7 illustrates embodiments of a portable box table with wheels and a steering apparatus for use of a portable box table as a transportation device.

FIG. 7 illustrates embodiments of a portable box table 700 showing how a portable box table may be configured to be its own transportation vehicle. Portions of the exemplary portable box table 700 may be configured in a manner similar to the portable box table 100 previously described with respect to FIG. 1. As such, parts of the portable box table 700 labeled as 701-703, 706, 714-716, 741, 750-756, 759, 770, 772, 774, and 786-787 may be similarly configured as those corresponding parts of the portable box table 100 labeled as 101-103, 106, 114-116, 141, 150-156, 159, 170, 172, 174, and 186-187. Portions of the exemplary portable box table 700 may be configured in a manner similar to the portable box table 200 previously described with respect to FIG. 2. As such, parts of the portable box table 700 labeled as 701-703, 705-706, 714-716, 741, 750-756, 759, 770, 772, and 774 may be similarly configured as those corresponding parts of the portable box table 200 labeled as 201-203, 205-206, 214-216, 241, 250-256, 259, 270, 272, and 274. Likewise, portions of the exemplary portable box table 700 may be configured in a manner similar to the portable box table 300 previously described with respect to FIG. 3. As such, parts of the portable box table 700 labeled as 701-703, 705-706, 714-716, 741, 750-756, 759, 770, 772, and 774 may be similarly configured as those corresponding parts of the portable box table 300 labeled as 301-303, 305-306, 314-316, 341, 350-356, 359, 370, 372, and 374, while the hinge 786 may be similarly configured as the hinge comprising hinge parts 386*a*, 386*b*, and the hinge 787 may be similarly configured as the hinge comprising hinge parts 387*a*, 387*b*. Portions of the exemplary portable box table 700 may be configured in a manner similar to the portable box table 400 previously described with respect to FIG. 4. As such, parts of the portable box table 700 labeled as 701-703, 705-706, 714-716, 731, 741, 750-752, 754-756, 759, 769-770, and 772 may be similarly configured as those corresponding parts of the portable box table 400 labeled as 401-403, 405-406, 414-416, 731, 441, 450-452, 454-456, 459, 469-470, and 472. Portions of the exemplary portable box table 700 may be configured in a manner similar to the portable box table 500 previously described with respect to FIG. 5. As such, parts of the portable box table 700 labeled as 701-703, 705-706, 714-716, 731, 741, 750-752, 754-756, 759, 769-770, and 772 may be similarly configured as those corresponding parts of the portable box table 500 labeled as 501-503, 505-506, 514-516, 531, 541, 550-552, 554-556, 559, 569-570, and 572. Portions of the exemplary portable box table 700 may be configured in a manner similar to the portable box table 600 previously described with respect to FIG. 6. As such, parts of the portable box table 700 labeled as 701-703, 705-706, 714-716, 731, 741, 750-752, 754-756, 759, 769-770, and 772 may be similarly configured as those corresponding parts of the portable box table 600 labeled as 601-603, 605-606, 614-616, 631, 641, 650-652, 654-656, 659, 669-670, and 672.

Essentially, the exemplary portable box table 700 may be similarly configured as any one of the portable box tables 100-600, 800-900, and 1100-1400 except that it may be then positioned on its side (e.g., the side 706) for use as a human-powered vehicle, in order to transport the portable box table 700 to another location. As an example, a user may utilize the configuration illustrated in FIG. 7 for transporting the portable box table 700 from one location to another, then the portable box table 700 may be repositioned in a manner as similarly shown in FIG. 2, 3, or 14-15 in order to make use of the various table surfaces (e.g., table surface 705) and the inside (not shown) of the storage body 741 of the portable box table 700.

To transform a portable box table into the aforementioned configuration illustrated in FIG. 7, elongated frame member 770 may be connected to elongated frame members 798 and 799, which are slideably inserted into the inside hollow portions of elongated frame members 756 and 759, respectively. The elongated frame member 770 can be pulled outward from the portable box table 700, and then a steerable wheeled assembly comprising the handle 761, the wheel 762, and the pedals 763 may be attached to the elongated frame member 770 by an appropriate connecting means 797, which may comprise some sort of bolted or bracket mechanism for affixing to the elongated frame member 770. Then, a user of the portable box table 700 may transport the portable box table 700 to another location. Additionally, some type of seat 760 may be attachable to, or integrated with (e.g., in a pivotable arrangement between retracted and useable positions), the frame 750 (e.g., the elongated frame member 772) of the portable box table 700. The steering and wheel assembly and/or the seat 760 may be stored within the inside of the portable box table 700 when not in use, such as when the user of the portable box table 700 sets up the portable box table 700 and its extendable table surfaces (e.g., 705) for use.

Furthermore, the wheels (e.g., the wheel 731 and its corresponding other wheel hidden in this view) may be repositioned to provide more clearance between the side 706 and the surface of the ground during transportation by switching the axle to one of the other holes in the wheel tabs (e.g., holes 421a, 421b in wheel tabs 465a, 465b, respectively, as shown in FIG. 4).

Figure 10:
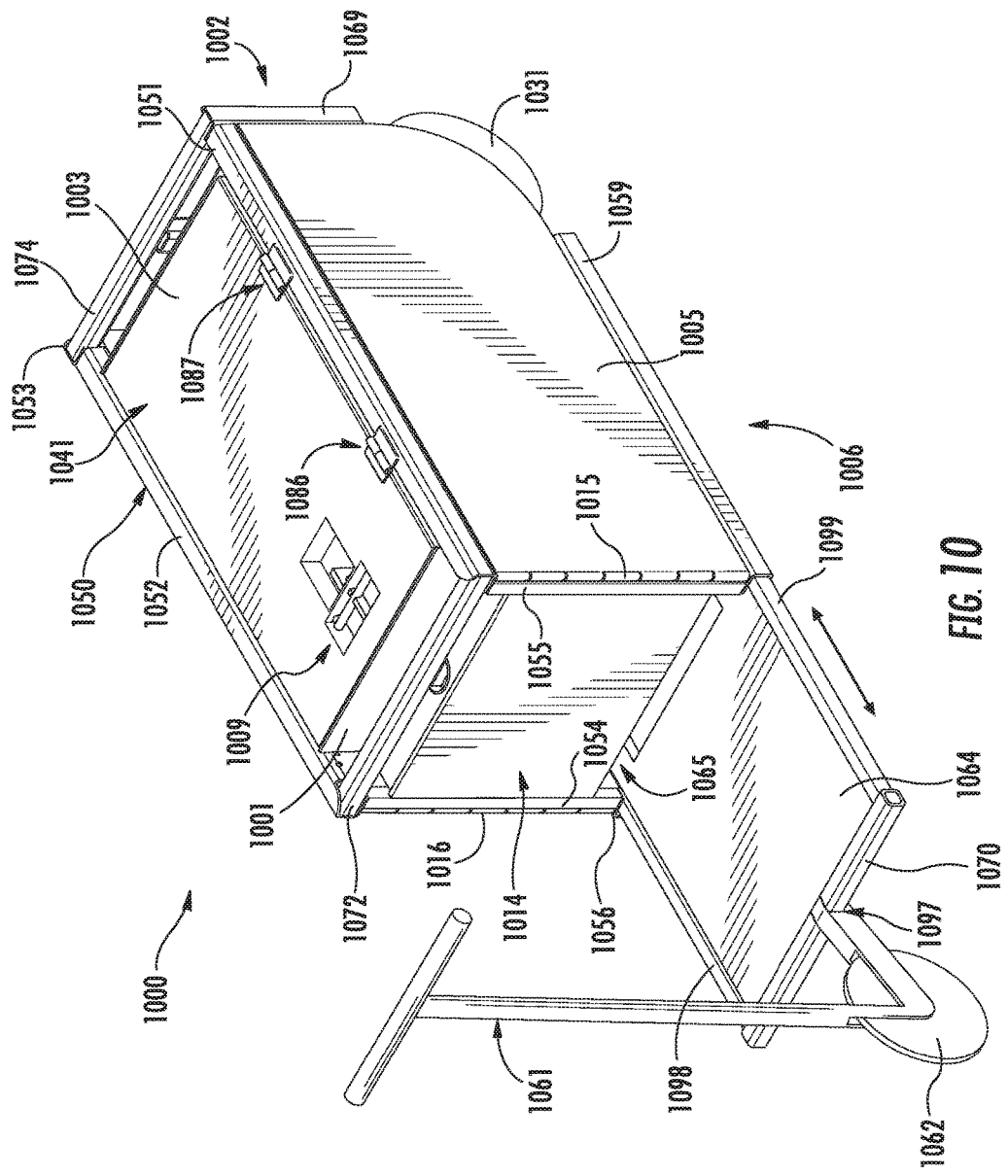
FIG. 10 illustrates embodiments of a portable box table showing an addition of a wheel and handle for human or motor powered movement.

FIG. 10 illustrates a portable box table 1000, which may be similarly configured as the portable box table 700 except that the extendable member 1070 may be modified so that it provides a standing platform 1064 for a user during transportation of the portable box table 1000. As such, the parts of the portable box table 1000 labeled as 1001-1003, 1005-1006, 1014-1016, 1031, 1041, 1050-1056, 1059, 1069-1070, 1072, and 1074 may be similarly configured as the corresponding parts of the portable box table 700 labeled as 701-703, 705-706, 714-716, 731, 741, 750-756, 759, 769-770, 772, and 774. Furthermore, the steering handle 1061 and wheel 1062 may be modified to not include pedals. With such a configuration, the user could simply use their foot power in a scooter-like manner in order to propel the portable box table 1000. Alternatively, the portable box table 1000 may include some type of electric or other powered motor (not shown) housed inside or outside the storage body 1041 of the portable box table 1000 in order to power the wheels 1031 and/or 1062. Various means for accelerating and braking the portable box table 1000 have not been included for the sake of simplicity, since such items are well known in the art.

Figure 8:
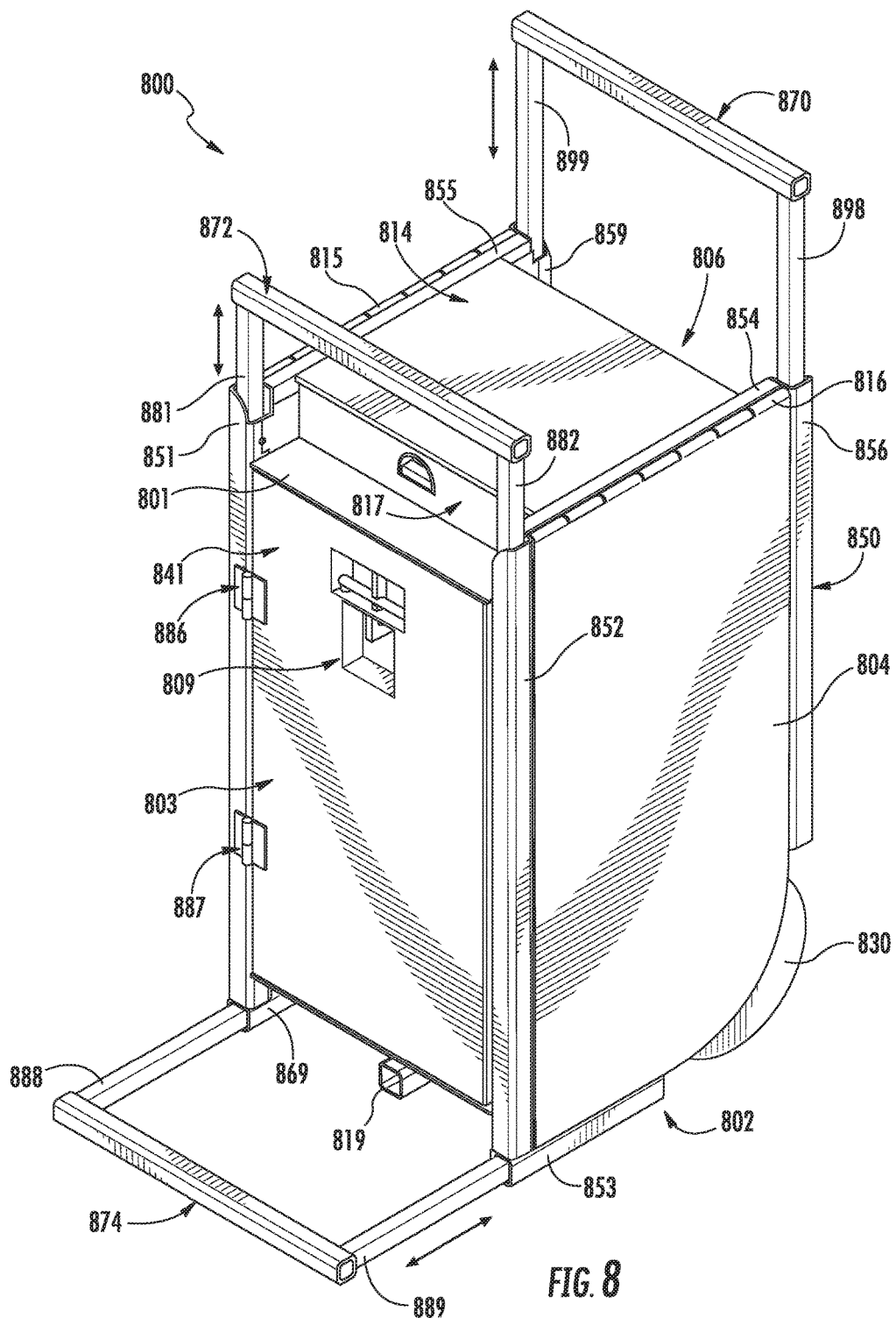
FIG. 8 illustrates embodiments of a portable box table with various exemplary arrangements of integrated handles.

FIG. 8 illustrates embodiments of a portable box table 800, showing various exemplary configurations for including one or more extendable handles. Note that any of the exemplary embodiments of a portable box table disclosed in FIGS. 1-7 and 9-14 may be configured to incorporate one or more extendable handles as described hereinafter with respect to FIG. 8. The exemplary portable box table 800 may be configured in a manner similar to the portable box table 700 previously described with respect to FIG. 7. As such, parts of the portable box table 800 labeled as 801-803, 806, 814-816, 841, 850-856, 859, 869-870, 872, 874, 886-887, and 898-899 may be similarly configured as those corresponding parts of the portable box table 700 labeled as 701-703, 706, 714-716, 741, 750-756, 759, 769-770, 772, 774, 786-787, and 798-799. The exemplary portable box table 800 may be configured in a manner similar to the portable box table 100 previously described with respect to FIG. 1. As such, parts of the portable box table 800 labeled as 801-804, 806, 809, 814-817, 819, 830, 841, 850-856, 859, 870, 872, 874, and 886-887 may be similarly configured as those corresponding parts of the portable box table 100 labeled as 101-104, 106, 109, 114-117, 119, 130, 141, 150-156, 159, 170, 172, 174, and 186-187. The exemplary portable box table 800 may be configured in a manner similar to the portable box table 200 previously described with respect to FIG. 2. As such, parts of the portable box table 800 labeled as 801-804, 806, 814-817, 830, 841, 850-856, 859, 870, 872, and 874 may be similarly configured as those corresponding parts of the portable box table 200 labeled as 201-204, 206, 214-217, 230, 241, 250-256, 259, 270, 272, and 274. The exemplary portable box table 800 may be configured in a manner similar to the portable box table 300 previously described with respect to FIG. 3. As such, parts of the portable box table 800 labeled as 801-804, 806, 809, 814-817, 830, 841, 850-856, 859, 870, 872, and 874 may be similarly configured as those corresponding parts of the portable box table 300 labeled as 301-303, 305-306, 309, 314-316, 330, 341, 350-356, 359, 370, 372, and 374, while the hinge 886 may be similarly configured as the hinge comprising hinge parts 386a, 386b, and the hinge 887 may be similarly configured as the hinge comprising hinge parts 387a, 387b. The exemplary portable box table 800 may be configured in a manner similar to the portable box table 400 previously described with respect to FIG. 4. As such, parts of the portable box table 800 labeled as 801-803, 806, 814-816, 830, 841, 850-852, 854-856, 859, 869-870, and 872 may be similarly configured as those corresponding parts of the portable box table 400 labeled as 401-403, 406, 414-416, 430, 441, 450-452, 454-456, 459, 469-470, and 472. The exemplary portable box table 800 may be configured in a manner similar to the portable box table 500 previously described with respect to FIG. 5. As such, parts of the portable box table 800 labeled as 801-803, 806, 814-816, 830, 841, 850-852, 854-856, 859, 869-870, and 872 may be similarly configured as those corresponding parts of the portable box table 500 labeled as 501-503, 506, 514-516, 530, 541, 550-552, 554-556, 559, 569-570, and 572. The exemplary portable box table 800 may be configured in a manner similar to the portable box table 600 previously described with respect to FIG. 6. As such, parts of the portable box table 800 labeled as 801-803, 806, 814-816, 830, 841, 850-852, 854-856, 859, 869-870, and 872 may be similarly configured as those corresponding parts of the portable box table 600 labeled as 601-603, 614-616, 630, 641, 650-652, 654-656, 659, 669-670, and 672.

One or more handles (e.g., the handles 870, 872, 874) may be integrated so that they retract into and extend out from various elongated frame members of the frame 850 of the portable box table 800. For example, the handle 870 may be affixed to elongated members 898, 899, which slideably extend from the inside hollow portions of the elongated frame members 856, 859, respectively. Note that with all extendable handles and frame members described herein, some sort of locking mechanism may be implemented to maintain such extendable handles/frame members in various positions. For example, a locking mechanism may be implemented to maintain the handle 870 in its retracted position (e.g., see the frame member 170 of the portable box table 100 illustrated in FIG. 1). Furthermore, some sort of suitable locking mechanism may be implemented to maintain handle 870 in a specified extended position.

FIG. 8 further illustrates an example of how the elongated frame member 872 may be configured as an extendable handle in a similar manner as the extendable handle 870. In this instance, the elongated frame member 872 is affixed to a pair of elongated frame members 881, 882, which are slideably inserted into the hollow portions of the frame members 851, 852, respectively. Likewise, FIG. 8 illustrates an example of how the elongated frame member 874 may be configured in an extendable manner. In this example, the elongated frame member 874 is affixed to a pair of elongated frame members 888, 889, which are slideably inserted within the hollow portions of elongated frame members 869, 853, respectively. As an example of an application of the utilization of the extendable frame member 874, such an extendable member may be utilized as a shelf or ledge for holding an object during transportation of the portable box table 800.

Any one or more of such extendable handles may be included in order to facilitate transportation and/or carrying of the portable box table, or the carrying of items strapped to the portable box table. For example, the extendable handle 870 may be extended when the portable box table 800 has been packed up for transporting to another location, so that it may be then pushed or pulled on its wheel(s) 830. Alternatively, such one or more extendable handles may be implemented with either of the pivoting or extending wheel embodiments illustrated in FIGS. 5 and 6. For example, an extendable handle, such as the handle 870, may be implemented with the pivoting wheel assembly 540, 544 shown in FIG. 5, or with the extending wheel assembly 640, 644 shown in FIG. 6.

Figure 9:
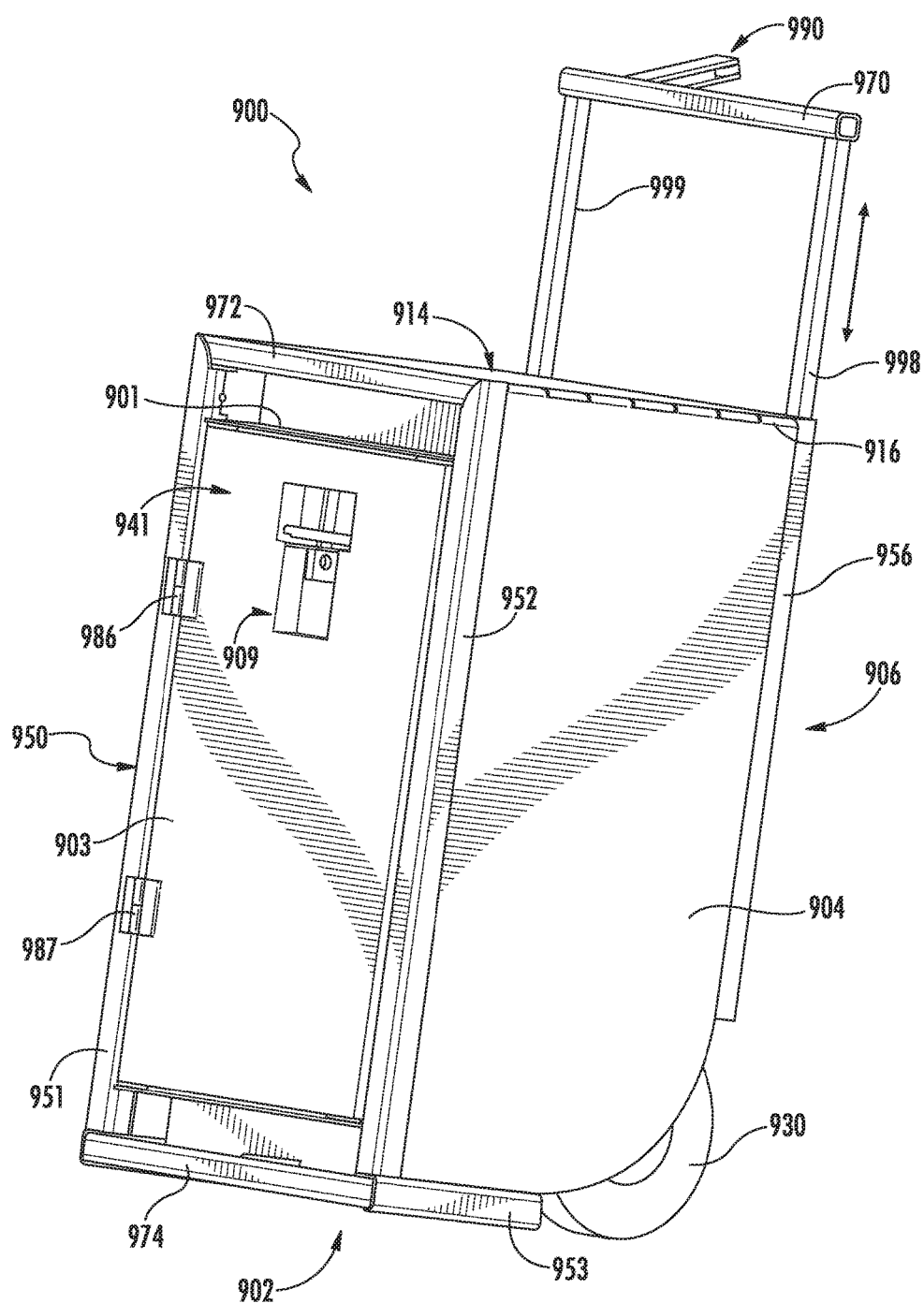
FIG. 9 illustrates embodiments of a portable box table with an exemplary attachment for coupling to a vehicle, animal, or person as a trailer unit.

FIG. 9 illustrates a portable box table 900 configured to include a connection mechanism 990, which may be configured in a well-known manner to couple to a person, animal, bicycle, motorbike, or other vehicle to thereby be towed in a trailer-like manner. In the example illustrated in FIG. 9, the connection mechanism 990 may be attached (e.g., via a bracket or bolt assembly) to the handle 970, or integrally formed (e.g., welded) with the handle 970. The other end of the connection mechanism 990 may be configured in any well-known manner to couple to an animal harness, a bicycle part, a motor bike part, or may be configured with some sort of handle for use by a human.

The exemplary portable box table 900 may be configured in a manner similar to the portable box table 800 previously described with respect to FIG. 8. As such, parts of the portable box table 900 labeled as 901-904, 906, 909, 914, 916, 930, 941, 950-953, 956, 970, 972, 974, 986-987, and 998-999 may be configured in a manner similar to those corresponding parts of the portable box table 800 labeled as 801-804, 806, 809, 814, 816, 830, 841, 850-853, 856, 870, 872, 874, 886-887, and 898-899. The exemplary portable box table 900 may be configured in a manner similar to the portable box table 700 previously described with respect to FIG. 7. As such, parts of the portable box table 900 labeled as 901-903, 906, 914, 916, 941, 950-953, 956, 970, 972, 974, 986-987, and 998-999 may be similarly configured as those corresponding parts of the portable box table 700 labeled as 701-703, 706, 714, 716, 741, 750-753, 756, 770, 772, 774, 786-787, and 798-799. The exemplary portable box table 900 may be configured in a manner similar to the portable box table 600 previously described with respect to FIG. 6. As such, parts of the portable box table 900 labeled as 901-903, 906, 914, 916, 930, 941, 950-952, 956, 970, and 972 may be similarly configured as those corresponding parts of the portable box table 600 labeled as 601-603, 606, 614, 616, 630, 641, 650-652, 656, 670, and 672. The exemplary portable box table 900 may be configured in a manner similar to the portable box table 500 previously described with respect to FIG. 5. As such, parts of the portable box table 900 labeled as 901-903, 906, 914, 916, 930, 941, 950-952, 956, 970, and 972 may be similarly configured as those corresponding parts of the portable box table 500 labeled as 501-503, 506, 514, 516, 530, 541, 550-552, 556, 570, and 572. The exemplary portable box table 900 may be configured in a manner similar to the portable box table 400 previously described with respect to FIG. 4. As such, parts of the portable box table 900 labeled as 901-903, 906, 914, 916, 930, 941, 950-952, 956, 970, and 972 may be similarly configured as those corresponding parts of the portable box table 400 labeled as 401-403, 406, 414, 416, 430, 441, 450-452, 456, 470, and 472. The exemplary portable box table 900 may be configured in a manner similar to the portable box table 300 previously described with respect to FIG. 3. As such, parts of the portable box table 900 labeled as 901-904, 906, 909, 914, 916, 930, 941, 950-953, 956, 970, 972, and 974 may be configured in a manner similar to those corresponding parts of the portable box table 300 labeled as 301-304, 306, 309, 314, 316, 330, 341, 350-353, 356, 370, 372, and 374, while the hinge 986 may be similarly configured as the hinge comprising hinge parts 386a, 386b, and the hinge 987 may be similarly configured as the hinge comprising hinge parts 387a, 387b. The exemplary portable box table 900 may be configured in a manner similar to the portable box table 200 previously described with respect to FIG. 2. As such, parts of the portable box table 900 labeled as 901-904, 906, 909, 914, 916, 930, 941, 950-953, 956, 970, 972, and 974 may be configured in a manner similar to those corresponding parts of the portable box table 200 labeled as 201-204, 206, 209, 214, 216, 230, 241, 250-253, 256, 270, 272, and 274. The exemplary portable box table 900 may be configured in a manner similar to the portable box table 100 previously described with respect to FIG. 1. As such, parts of the portable box table 900 labeled as 901-904, 906, 909, 914, 916, 930, 941, 950-953, 956, 970, 972, 974, and 986-987 may be configured in a manner similar to those corresponding parts of the portable box table 100 labeled as 101-104, 106, 109, 114, 116, 130, 141, 150-153, 156, 170, 172, 174, and 186-187.

Figure 11:
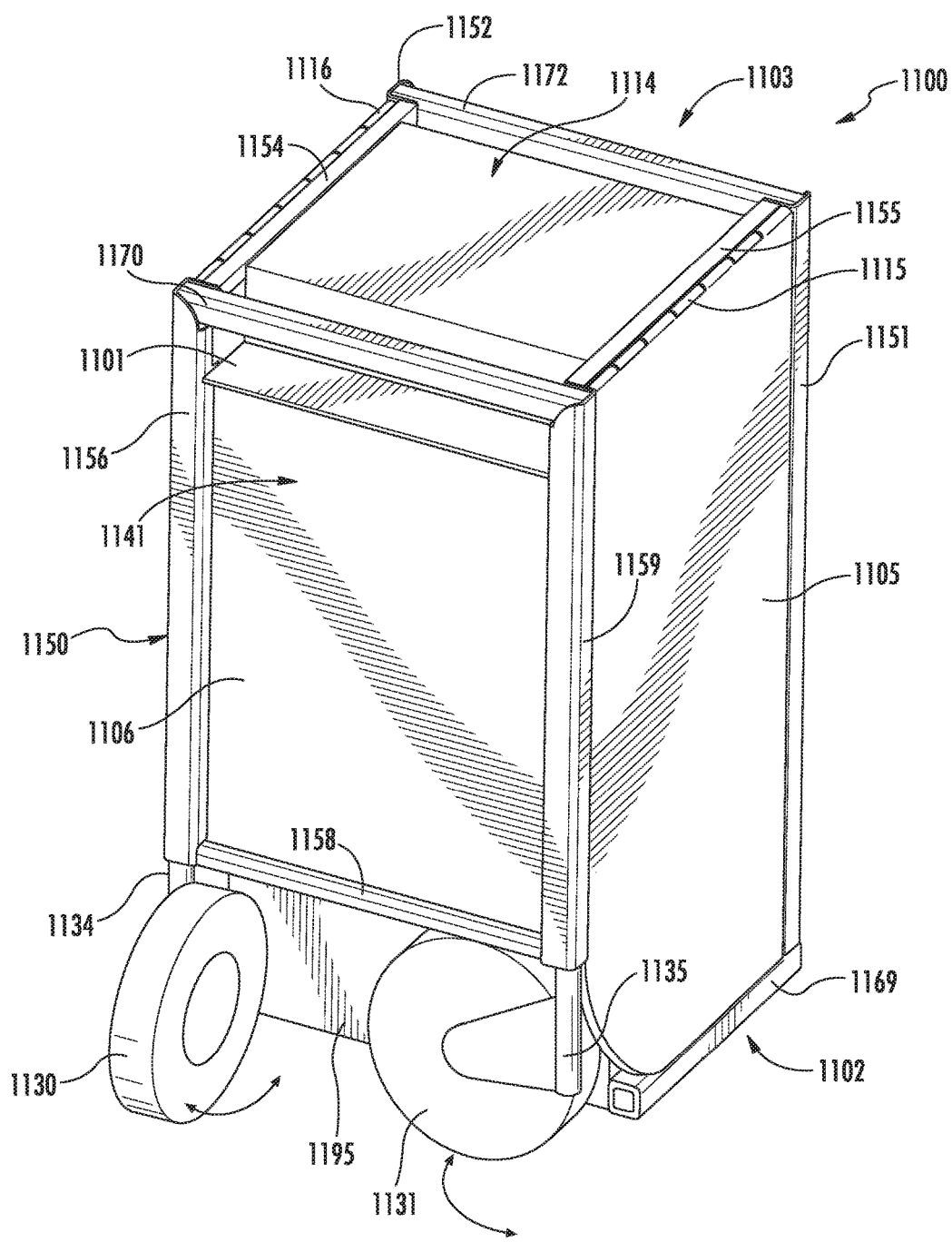
FIG. 11 illustrates embodiments of a portable box table showing pivoting wheel assemblies.

FIG. 11 illustrates a portable box table 1100 configured to include pivotable wheel assemblies. The exemplary portable box table 1100 may be configured in a manner similar to the portable box table 1000 previously described with respect to FIG. 10. As such, parts of the portable box table 1100 labeled as 1101-1103, 1105-1106, 1114-1116, 1141, 1150-1152, 1154-1156, 1159, 1169-1170, and 1172 may be similarly configured as those corresponding parts of the portable box table 1000 labeled as 1001-1003, 1005-1006, 1014-1016, 1041, 1050-1052, 1054-1056, 1059, 1069-1070, and 1072. The exemplary portable box table 1100 may be configured in a manner similar to the portable box table 900 previously described with respect to FIG. 9. As such, parts of the portable box table 1100 labeled as 1101-1103, 1106, 1114, 1116, 1141, 1150-1152, 1156, 1170, and 1172 may be similarly configured as those corresponding parts of the portable box table 900 labeled as 901-903, 906, 914, 916, 941, 950-952, 956, 970, and 972. The exemplary portable box table 1100 may be configured in a manner similar to the portable box table 800 previously described with respect to FIG. 8. As such, parts of the portable box table 1100 labeled as 1101-1103, 1106, 1114-1116, 1141, 1150-1152, 1154-1156, 1159, 1169-1170, and 1172 may be similarly configured as those corresponding parts of the portable box table 800 labeled as 801-803, 806, 814-816, 841, 850-852, 854-856, 859, 869-870, and 872. The exemplary portable box table 1100 may be configured in a manner similar to the portable box table 700 previously described with respect to FIG. 7. As such, parts of the portable box table 1100 labeled as 1101-1103, 1105-1106, 1114-1116, 1141, 1150-1152, 1154-1156, 1159, 1169-1170, and 1172 may be similarly configured as those corresponding parts of the portable box table 700 labeled as 701-703, 705-706, 714-716, 741, 750-752, 754-756, 759, 769-770, and 772. The exemplary portable box table 1100 may be configured in a manner similar to the portable box table 600 previously described with respect to FIG. 6. As such, parts of the portable box table 1100 labeled as 1101-1103, 1105-1106, 1114-1116, 1141, 1150-1152, 1154-1156, 1158-1159, 1169-1170, 1172, and 1195 may be similarly configured as those corresponding parts of the portable box table 600 labeled as 601-603, 605-606, 614-616, 641, 650-652, 654-656, 658-659, 669-670, 672, and 695. The exemplary portable box table 1100 may be configured in a manner similar to the portable box table 500 previously described with respect to FIG. 5. As such, parts of the portable box table 1100 labeled as 1101-1103, 1105-1106, 1114-1116, 1141, 1150-1152, 1154-1156, 1158-1159, 1169-1170, 1172, and 1195 may be similarly configured as those corresponding parts of the portable box table 500 labeled as 501-503, 505-506, 514-516, 541, 550-552, 554-556, 558-559, 569-570, 572, and 595. The exemplary portable box table 1100 may be configured in a manner similar to the portable box table 400 previously described with respect to FIG. 4. As such, parts of the portable box table 1100 labeled as 1101-1103, 1105-1106, 1114-1116, 1141, 1150-1152, 1154-1156, 1158-1159, 1169-1170, 1172, and 1195 may be similarly configured as those corresponding parts of the portable box table 400 labeled as 401-403, 405-406, 414-416, 441, 450-452, 454-456, 458-459, 469-470, 472, and 495. The exemplary portable box table 1100 may be configured in a manner similar to the portable box table 300 previously described with respect to FIG. 3. As such, parts of the portable box table 1100 labeled as 1101-1103, 1105-1106, 1114-1116, 1141, 1150-1152, 1154-1156, 1159, 1170, and 1172 may be similarly configured as those corresponding parts of the portable box table 300 labeled as 301-303, 305-306, 314-316, 341, 350-352, 354-356, 359, 370, and 372. The exemplary portable box table 1100 may be configured in a manner similar to the portable box table 200 previously described with respect to FIG. 2. As such, parts of the portable box table 1100 labeled as 1101-1103, 1105-1106, 1114-1116, 1141, 1150-1152, 1154-1156, 1159, 1170, and 1172 may be similarly configured as those corresponding parts of the portable box table 200 labeled as 201-203, 205-206, 214-216, 241, 250-252, 254-256, 259, 270, and 272. The exemplary portable box table 1100 may be configured in a manner similar to the portable box table 100 previously described with respect to FIG. 1. As such, parts of the portable box table 1100 labeled as 1101-1103, 1106, 1114-1116, 1141, 1150-1152, 1154-1156, 1159, 1170, and 1172 may be similarly configured as those corresponding parts of the portable box table 100 labeled as 101-103, 106, 114-116, 141, 150-152, 154-156, 159, 170, and 172.

The wheel assemblies 1130 and 1131 may be pivoted around axle assemblies 1134 and 1135, respectively. For example, during storage or use of the portable box table 1100 at a location, the wheel assemblies 1130 and 1131 may be pivoted inward to a storage position, such as shown in FIG. 11 for the wheel assembly 1131. When the user is ready to move or transport the portable box table 1100 on its wheels, the wheel assemblies 1130 and 1131 may be pivoted outward, such as shown in FIG. 11 with respect to the wheel assembly 1130. A suitable locking mechanism may be utilized in order to retain the wheel assemblies 1130, 1131 in their retracted storage positions and/or their outwardly pivoted positions.

Figure 12:
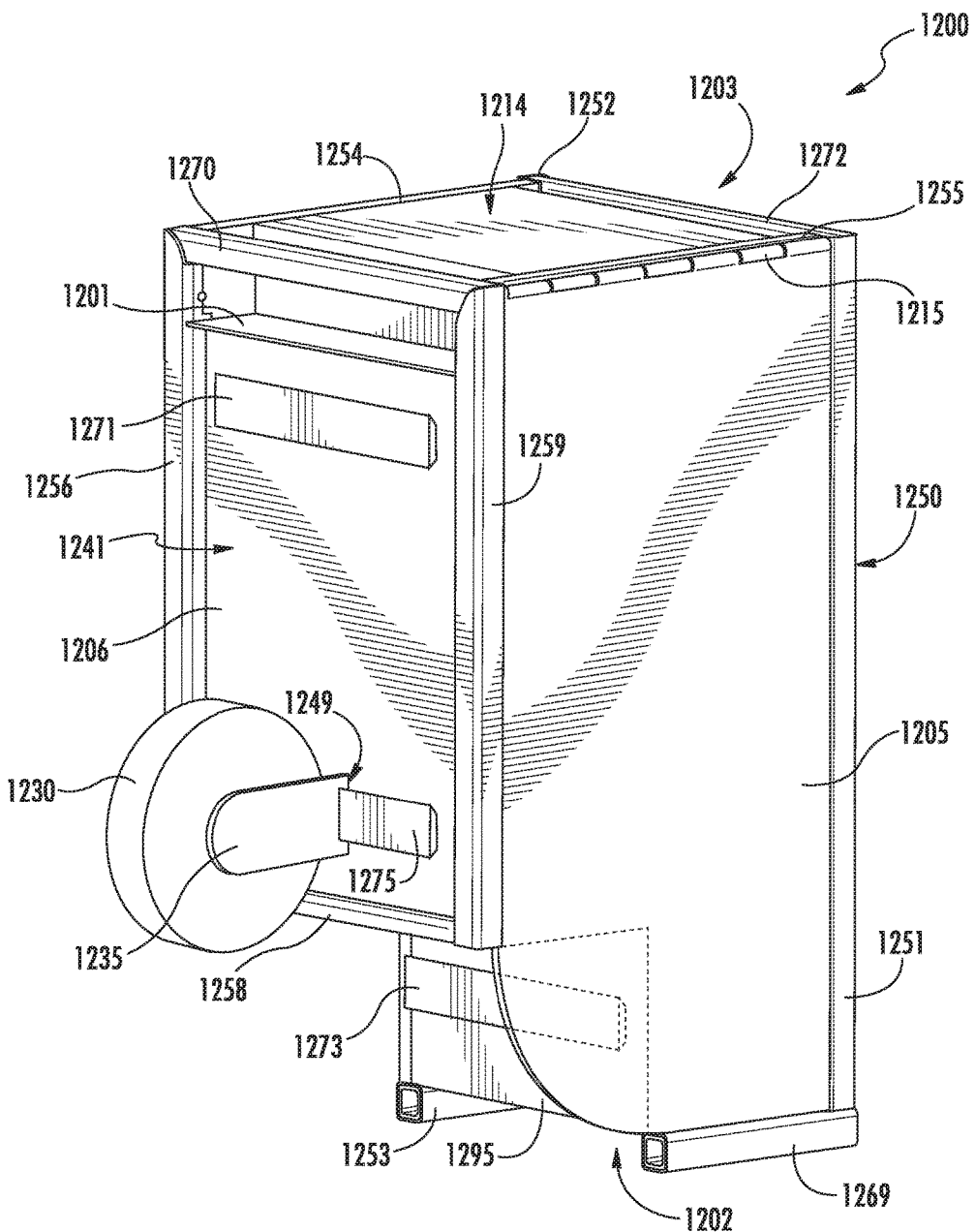
FIG. 12 illustrates embodiments of a portable box table showing attachment of a wheel or wheels by a cartridge mechanism.

FIG. 12 illustrates a portable box table 1200 configured to include one or more wheel assemblies that are attachable to one or more various locations on the portable box table 1200 with a cartridge mechanism. The exemplary portable box table 1200 may be configured in a manner similar to the portable box table 1100 previously described with respect to FIG. 11. As such, parts of the portable box table 1200 labeled as 1201-1203, 1205-1206, 1214-1215, 1241, 1250-1252, 1254-1256, 1258-1259, 1269-1270, 1272, and 1295 may be similarly configured as those corresponding parts of the portable box table 1100 labeled as 1101-1103, 1105-1106, 1114-1115, 1141, 1150-1152, 1154-1156, 1158-1159, 1169-1170, 1172, and 1195. The exemplary portable box table 1200 may be configured in a manner similar to the portable box table 1000 previously described with respect to FIG. 10. As such, parts of the portable box table 1200 labeled as 1201-1203, 1205-1206, 1214-1215, 1241, 1250-1256, 1259, 1269-1270, and 1272 may be similarly configured as those corresponding parts of the portable box table 1000 labeled as 1001-1003, 1005-1006, 1014-1015, 1041, 1050-1056, 1059, 1069-1070, and 1072. The exemplary portable box table 1200 may be configured in a manner similar to the portable box table 900 previously described with respect to FIG. 9. As such, parts of the portable box table 1200 labeled as 1201-1203, 1206, 1214, 1241, 1250-1253, 1256, 1270, and 1272 may be similarly configured as those corresponding parts of the portable box table 900 labeled as 901-903, 906, 914, 941, 950-953, 956, 970, and 972. The exemplary portable box table 1200 may be configured in a manner similar to the portable box table 800 previously described with respect to FIG. 8. As such, parts of the portable box table 1200 labeled as 1201-1203, 1206, 1214-1215, 1241, 1250-1256, 1259, 1269-1270, and 1272 may be similarly configured as those corresponding parts of the portable box table 800 labeled as 801-803, 806, 814-815, 841, 850-856, 859, 869-870, and 872. The exemplary portable box table 1200 may be configured in a manner similar to the portable box table 700 previously described with respect to FIG. 7. As such, parts of the portable box table 1200 labeled as 1201-1203, 1205-1206, 1214-1215, 1241, 1250-1256, 1259, 1269-1270, and 1272 may be similarly configured as those corresponding parts of the portable box table 700 labeled as 701-703, 705-706, 714-715, 741, 750-756, 759, 769-770, and 772. The exemplary portable box table 1200 may be configured in a manner similar to the portable box table 600 previously described with respect to FIG. 6. As such, parts of the portable box table 1200 labeled as 1201-1203, 1205-1206, 1214-1215, 1241, 1250-1252, 1254-1256, 1258-1259, 1269-1270, 1272, and 1295 may be similarly configured as those corresponding parts of the portable box table 600 labeled as 601-603, 605-606, 614-615, 641, 650-652, 654-656, 658-659, 669-670, 672, and 695. The exemplary portable box table 1200 may be configured in a manner similar to the portable box table 500 previously described with respect to FIG. 5. As such, parts of the portable box table 1200 labeled as 1201-1203, 1205-1206, 1214-1215, 1241, 1250-1252, 1254-1256, 1258-1259, 1269-1270, 1272, and 1295 may be similarly configured as those corresponding parts of the portable box table 500 labeled as 501-503, 505-506, 514-515, 541, 550-552, 554-556, 558-559, 569-570, 572, and 595. The exemplary portable box table 1200 may be configured in a manner similar to the portable box table 400 previously described with respect to FIG. 4. As such, parts of the portable box table 1200 labeled as 1201-1203, 1205-1206, 1214-1215, 1241, 1250-1252, 1254-1256, 1258-1259, 1269-1270, 1272, and 1295 may be similarly configured as those corresponding parts of the portable box table 400 labeled as 401-403, 405-406, 414-415, 441, 450-452, 454-456, 458-459, 469-470, 472, and 495. The exemplary portable box table 1200 may be configured in a manner similar to the portable box table 300 previously described with respect to FIG. 3. As such, parts of the portable box table 1200 labeled as 1201-1203, 1205-1206, 1214-1215, 1241, 1250-1256, 1259, 1270, and 1272 may be similarly configured as those corresponding parts of the portable box table 300 labeled as 301-303, 305-306, 314-315, 341, 350-356, 359, 370, and 372. The exemplary portable box table 1200 may be configured in a manner similar to the portable box table 200 previously described with respect to FIG. 2. As such, parts of the portable box table 1200 labeled as 1201-1203, 1205-1206, 1214-1215, 1241, 1250-1256, 1259, 1270, and 1272 may be similarly configured as those corresponding parts of the portable box table 200 labeled as 201-203, 205-206, 214-215, 241, 250-256, 259, 270, and 272. The exemplary portable box table 1200 may be configured in a manner similar to the portable box table 100 previously described with respect to FIG. 1. As such, parts of the portable box table 1200 labeled as 1201-1203, 1206, 1214-1215, 1241, 1250-1256, 1259, 1270, and 1272 may be similarly configured as those corresponding parts of the portable box table 100 labeled as 101-103, 106, 114-115, 141, 150-156, 159, 170, and 172.

In the examples illustrated in FIG. 12, the wheel assembly 1230, 1235 may be attached to any one or more of the cartridge mechanisms 1271, 1273, 1275 such as by sliding the axle assembly 1235 along one of the mechanisms 1271, 1273, 1275 (for example, in a manner so that the mechanism couples to a similarly shaped groove on the axle assembly). Note that the portable box table 1200 may include only one of such mechanisms 1271, 1273, 1275, or any number of such mechanisms, including more than the three shown in FIG. 12. The mechanisms 1271, 1273, 1275 may be fastened to any one or more of the various surfaces on the portable box table 1200, and the particular configuration illustrated in FIG. 12 is not limiting upon the various alternative configurations possible for attaching wheel assemblies to the portable box table 1200. The exemplary embodiments of the portable box table 1200 show a cartridge mechanism 1271 towards the top portion of the surface 1206, and the cartridge mechanism 1275 fastened towards the bottom portion of the surface 1206. The cartridge mechanism 1273 is shown fastened to another surface 1295 of the portable box table 1200. After the wheel assembly 1230, 1235 is attached to one of the cartridge mechanisms, the portable box table 1200 can then be moved to another location by rolling it upon the wheel 1230. Note also that the wheel assembly 1230, 1235 may be positioned anywhere along a length of any one of the cartridge mechanisms 1271, 1273, 1275. Furthermore, a plurality of wheel assemblies may be attached to a particular cartridge mechanism or a plurality of such cartridge mechanisms. For example, the portable box table 1200 may be configured with a plurality of wheels (e.g., 3 or 4) attached to the cartridge mechanisms and laid on its side in a position which may permit the interior of the portable box table 1200 to function as a cooler or other water holding storage device.

FIG. 13 illustrates a portable box table 1300 configured to include wheel assemblies that are positionable in various desired manners, such as to reposition a wheel so that it is extended further away from the storage body 1341 of the portable box table 1300. The exemplary portable box table 1300 may be configured in a manner similar to the portable box table 1200 previously described with respect to FIG. 12. As such, parts of the portable box table 1300 labeled as 1301-1303, 1305-1306, 1314-1315, 1341, 1350-1352, 1354-1356, 1358-1359, 1369-1370, 1372, and 1395 may be similarly configured as those corresponding parts of the portable box table 1200 labeled as 1201-1203, 1205-1206, 1214-1215, 1241, 1250-1252, 1254-1256, 1258-1259, 1269-1270, 1272, and 1295. The exemplary portable box table 1300 may be configured in a manner similar to the portable box table 1100 previously described with respect to FIG. 11. As such, parts of the portable box table 1300 labeled as 1301-1303, 1305-1306, 1314-1315, 1341, 1350-1352, 1354-1356, 1358-1359, 1369-1370, 1372, and 1395 may be similarly configured as those corresponding parts of the portable box table 1100 labeled as 1101-1103, 1105-1106, 1114-1115, 1141, 1150-1152, 1154-1156, 1158-1159, 1169-1170, 1172, and 1195. The exemplary portable box table 1300 may be configured in a manner similar to the portable box table 1000 previously described with respect to FIG. 10. As such, parts of the portable box table 1300 labeled as 1301-1303, 1305-1306, 1314-1315, 1331, 1341, 1350-1352, 1354-1356, 1358-1359, 1369-1370, and 1372 may be similarly configured as those corresponding parts of the portable box table 1000 labeled as 1001-1003, 1005-1006, 1014-1015, 1031, 1041, 1050-1052, 1054-1056, 1059, 1069-1070, and 1072. The exemplary portable box table 1300 may be configured in a manner similar to the portable box table 900 previously described with respect to FIG. 9. As such, parts of the portable box table 1300 labeled as 1301-1303, 1306, 1314, 1330, 1341, 1350-1353, 1356, 1370, and 1372 may be similarly configured as those corresponding parts of the portable box table 900 labeled as 901-903, 906, 914, 930, 941, 950-953, 956, 970, and 972. The exemplary portable box table 1300 may be configured in a manner similar to the portable box table 800 previously described with respect to FIG. 8. As such, parts of the portable box table 1300 labeled as 1301-1303, 1306, 1314-1315, 1330, 1341, 1350-1352, 1354-1356, 1359, 1369-1370, and 1372 may be similarly configured as those corresponding parts of the portable box table 800 labeled as 801-803, 806, 814-815, 830, 841, 850-852, 854-856, 859, 869-870, and 872. The exemplary portable box table 1300 may be configured in a manner similar to the portable box table 700 previously described with respect to FIG. 7. As such, parts of the portable box table 1300 labeled as 1301-1303, 1305-1306, 1314-1315, 1331, 1341, 1350-1352, 1354-1356, 1359, 1369-1370, and 1372 may be similarly configured as those corresponding parts of the portable box table 700 labeled as 701-703, 705-706, 714-715, 731, 741, 750-752, 754-756, 759, 769-770, and 772. The exemplary portable box table 1300 may be configured in a manner similar to the portable box table 600 previously described with respect to FIG. 6. As such, parts of the portable box table 1300 labeled as 1301-1303, 1305-1306, 1314-1315, 1330-1331, 1333, 1341, 1350-1352, 1354-1356, 1358-1359, 1369-1370, 1372, and 1395 may be similarly configured as those corresponding parts of the portable box table 600 labeled as 601-603, 605-606, 614-615, 630-631, 633, 641, 650-652, 654-656, 658-659, 669-670, 672, and 695. The exemplary portable box table 1300 may be configured in a manner similar to the portable box table 500 previously described with respect to FIG. 5. As such, parts of the portable box table 1300 labeled as 1301-1303, 1305-1306, 1314-1315, 1330-1331, 1333, 1341, 1350-1352, 1354-1356, 1358-1359, 1369-1370, 1372, and 1395 may be similarly configured as those corresponding parts of the portable box table 500 labeled as 501-503, 505-506, 514-515, 530N531, 533, 541, 550-552, 554-556, 558-559, 569-570, 572, and 595. The exemplary portable box table 1300 may be configured in a manner similar to the portable box table 400 previously described with respect to FIG. 4. As such, parts of the portable box table 1300 labeled as 1301-1303, 1305-1306, 1314-1315, 1330-1331, 1333, 1341, 1350-1352, 1354-1356, 1358-1359, 1369-1370, 1372, and 1395 may be similarly configured as those corresponding parts of the portable box table 400 labeled as 401-403, 405-406, 414-415, 430-431, 433, 441, 450-452, 454-456, 458-459, 469-470, 472, and 495. The exemplary portable box table 1300 may be configured in a manner similar to the portable box table 300 previously described with respect to FIG. 3. As such, parts of the portable box table 1300 labeled as 1301-1303, 1305-1306, 1314-1315, 1330, 1341, 1350-1352, 1354-1356, 1359, 1370, and 1372 may be similarly configured as those corresponding parts of the portable box table 300 labeled as 301-303, 305-306, 314-315, 330, 341, 350-352, 354-356, 359, 370, and 372. The exemplary portable box table 1300 may be configured in a manner similar to the portable box table 200 previously described with respect to FIG. 2. As such, parts of the portable box table 1300 labeled as 1301-1303, 1305-1306, 1314-1315, 1330, 1341, 1350-1352, 1354-1356, 1359, 1370, and 1372 may be similarly configured as those corresponding parts of the portable box table 200 labeled as 201-203, 205-206, 214-215, 230, 241, 250-252, 254-256, 259, 270, and 272. The exemplary portable box table 1300 may be configured in a manner similar to the portable box table 100 previously described with respect to FIG. 1. As such, parts of the portable box table 1300 labeled as 1301-1303, 1306, 1314-1315, 1330, 1341, 1350-1352, 1354-1356, 1359, 1370, and 1372 may be similarly configured as those corresponding parts of the portable box table 100 labeled as 101-103, 106, 114-115, 130, 141, 150-152, 154-156, 159, 170, and 172.

In the examples illustrated in FIG. 13, wheel tabs 1365*a*, 1365*b* may be fastened to the surface 1395 of the portable box table 1300, and may also be fastened to the underneath surface 1397 below the surface 1306. As previously described with respect to FIG. 4, each of the wheel tabs 1365*a*, 1365*b* may include one or more pairs of axle holes 1321*a*-1321*b*, 1322*a*, 1323*a*, 1324*a*, (the axle holes paired with 1322*a*, 1323*a*, and 1324*a* are not visible for the wheel tab 1365*b*). As previously described with respect to FIG. 4, such axle holes allow the positioning of the axle 1333, and correspondingly the wheels 1330, 1331, in various positions relative to the wheel tabs 1365*a*, 1365*b*, and thus in various positions relative to the overall portable box table 1300. The example of FIG. 13 shows the wheels 1330, 1331 attached to the axle 1333 which passes through the axle hole 1323*a*. Alternatively, the axle 1333 could be positioned in any one of the other axle holes. A benefit of such various axle holes is that it allows the user to move the wheels 1330, 1331 further away from the body 1341 of the portable box table 1300, which may allow for easier maneuverability, such as for over uneven or rough terrain or other situations with less than perfect conditions. Furthermore, the wheels 1330, 1331 could be placed in a lower position (e.g., the axle hole 1323*a*) along with a corresponding kick stand 1396 or other apparatus, in order to raise the level/height of the overall portable box table 1300 above ground.

FIGS. 14-15 illustrate a portable box table 1400 showing exemplary embodiments whereby one of the sides of the storage body 1441 can be detached in order to provide for an erectable surface, which may be utilized as a table, stool, step, or the like. Though the example illustrated in FIGS. 14-15 (and also FIGS. 2-3) shows a detachment of the front side 1403, any of the other sides of the storage body 1441 may be similarly configured.

The exemplary portable box table 1400 may be configured in a manner similar to the portable box table 1300 previously described with respect to FIG. 13. As such, parts of the portable box table 1400 labeled as 1401, 1403, 1405-1406, 1415, 1430-1431, 1433, 1441, 1450-1452, 1454-1456, 1458-1459, 1465*a*-1465*b*, 1469-1470, 1472, and 1495 may be similarly configured as those corresponding parts of the portable box table 1300 labeled as 1301, 1303, 1305-1306, 1315, 1330-1331, 1333, 1341, 1350-1352, 1354-1356, 1358-1359, 1365*a*-1365*b*, 1369-1370, 1372, and 1395. The exemplary portable box table 1400 may be configured in a manner similar to the portable box table 1200 previously described with respect to FIG. 12. As such, parts of the portable box table 1400 labeled as 1401, 1403, 1405-1406, 1414-1415, 1441, 1450-1452, 1454-1456, 1458-1459, 1469-1470, 1472, and 1495 may be similarly configured as those corresponding parts of the portable box table 1200 labeled as 1201, 1203, 1205-1206, 1214-1215, 1241, 1250-1252, 1254-1256, 1258-1259, 1269-1270, 1272, and 1295. The exemplary portable box table 1400 may be configured in a manner similar to the portable box table 1100 previously described with respect to FIG. 11. As such, parts of the portable box table 1400 labeled as 1401, 1403, 1405-1406, 1414-1416, 1441, 1450-1452, 1454-1456, 1458-1459, 1469-1470, 1472, and 1495 may be similarly configured as those corresponding parts of the portable box table 1100 labeled as 1101, 1103, 1105-1106, 1114-1116, 1141, 1150-1152, 1154-1156, 1158-1159, 1169-1170, 1172, and 1195. The exemplary portable box table 1400 may be configured in a manner similar to the portable box table 1000 previously described with respect to FIG. 10. As such, parts of the portable box table 1400 labeled as 1401, 1403, 1405-1406, 1414-1416, 1430, 1441, 1450-1452, 1454-1456, 1459, 1469-1470, and 1472 may be similarly configured as those corresponding parts of the portable box table 1000 labeled as 1001, 1003, 1005-1006, 1014-1016, 1030, 1041, 1050-1052, 1054-1056, 1059, 1069-1070, and 1072. The exemplary portable box table 1400 may be configured in a manner similar to the portable box table 900 previously described with respect to FIG. 9. As such, parts of the portable box table 1400 labeled as 1401, 1403, 1406, 1414, 1416, 1430, 1441, 1450-1452, 1456, 1470, and 1472 may be similarly configured as those corresponding parts of the portable box table 900 labeled as 901, 903, 906, 914, 916, 930, 941, 950-952, 956, 970, and 972. The exemplary portable box table 1400 may be configured in a manner similar to the portable box table 800 previously described with respect to FIG. 8. As such, parts of the portable box table 1400 labeled as 1401, 1403, 1406, 1414-1416, 1430, 1441, 1450-1452, 1454-1456, 1459, 1469-1470, and 1472 may be similarly configured as those corresponding parts of the portable box table 800 labeled as 801, 803, 806, 814-816, 830, 841, 850-852, 854-856, 859, 869-870, and 872. The exemplary portable box table 1400 may be configured in a manner similar to the portable box table 700 previously described with respect to FIG. 7. As such, parts of the portable box table 1400 labeled as 1401, 1403, 1405-1406, 1414-1416, 1431, 1441, 1450-1452, 1454-1456, 1459, 1469-1470, and 1472 may be similarly configured as those corresponding parts of the portable box table 700 labeled as 701, 703, 705-706, 714-716, 731, 741, 750-752, 754-756, 759, 769-770, and 772. The exemplary portable box table 1400 may be configured in a manner similar to the portable box table 600 previously described with respect to FIG. 6. As such, parts of the portable box table 1400 labeled as 1401, 1403, 1405-1406, 1414-1416, 1430-1431, 1433, 1441, 1450-1452, 1454-1456, 1458-1459, 1469-1470, 1472, and 1495 may be similarly configured as those corresponding parts of the portable box table 600 labeled as 601, 603, 605-606, 614-616, 630-631, 633, 641, 650-652, 654-656, 658-659, 669-670, 672, and 695. The exemplary portable box table 1400 may be configured in a manner similar to the portable box table 500 previously described with respect to FIG. 5. As such, parts of the portable box table 1400 labeled as 1401, 1403, 1405-1406, 1414-1416, 1430-1431, 1433, 1441, 1450-1452, 1454-1456, 1458-1459, 1469-1470, 1472, and 1495 may be similarly configured as those corresponding parts of the portable box table 500 labeled as 501, 503, 505-506, 514-516, 530-531, 533, 541, 550-552, 554-556, 558-559, 569-570, 572, and 595. The exemplary portable box table 1400 may be configured in a manner similar to the portable box table 400 previously described with respect to FIG. 4. As such, parts of the portable box table 1400 labeled as 1401, 1403, 1405-1406, 1414-1416, 1430-1431, 1433, 1441, 1450-1452, 1454-1456, 1458-1459, 1469-1470, 1472, and 1495 may be similarly configured as those corresponding parts of the portable box table 400 labeled as 401, 403, 405-406, 414-416, 430-431, 433, 441, 450-452, 454-456, 458-459, 469-470, 472, and 495. The exemplary portable box table 1400 may be configured in a manner similar to the portable box table 300 previously described with respect to FIG. 3. As such, parts of the portable box table 1400 labeled as 1401, 1403, 1405-1406, 1414-1416, 1430, 1441, 1450-1452, 1454-1456, 1459, 1470, and 1472 may be similarly configured as those corresponding parts of the portable box table 300 labeled as 301, 303, 305-306, 314-316, 330, 341, 350-352, 354-356, 359, 370, and 372. The exemplary portable box table 1400 may be configured in a manner similar to the portable box table 200 previously described with respect to FIG. 2. As such, parts of the portable box table 1400 labeled as 1401, 1403, 1405-1406, 1414-1416, 1430, 1441, 1450-1452, 1454-1456, 1459, 1470, and 1472 may be similarly configured as those corresponding parts of the portable box table 200 labeled as 201, 203, 205-206, 214-216, 230, 241, 250-252, 254-256, 259, 270, and 272. The exemplary portable box table 1400 may be configured in a manner similar to the portable box table 100 previously described with respect to FIG. 1. As such, parts of the portable box table 1400 labeled as 1401, 1403, 1406, 1414-1416, 1430, 1441, 1450-1452, 1454-1456, 1459, 1470, and 1472 may be similarly configured as those corresponding parts of the portable box table 100 labeled as 101, 103, 106, 114-116, 130, 141, 150-152, 154-156, 159, 170, and 172.

The front side 1403 may be detached in a similar manner as what was described with respect to the front side 303 in FIG. 3.

As can be seen in FIG. 14, a plurality of legs (e.g., three) may be recessed/retracted into the recess space 1484 on the inside of the front side 1403. This may be accomplished by pivoting the legs (e.g., 1481-1483) on hinges or pivot points (e.g., pivot points 1448, 1449). After the front side 1403 is detached from the portable box table 1400, the legs 1481-1483 may be extended from underneath the recessed portion 1484 so that the front side 1403 may be utilized as a working surface, such as illustrated in FIG. 15. Note that any suitable mechanism for locking in place the legs 1481-1483 may be utilized to maintain stability of the working surface of the front side 1403. Furthermore, note that the legs 1481-1483 may be replaced with extendable legs, such as legs 312a-312d illustrated in FIG. 3.

Note, the wheel tabs, wheel assemblies, etc. shown in FIG. 13, or any of the other embodiments described herein may include shock absorbers, springs, or damper/damping devices. Furthermore, the various wheels shown herein may comprise any form of a wheel, including pneumatic and inflatable tires.

Note that for both of the portable box tables 1200 and 1300, the wheels could be positioned for use for various situations where there is a single track through which a wheel has to run, over various widths of trails, fire roads, or other unpaved paths. Note that any of the embodiments of a portable box table disclosed herein may be carried or towed by a person or animal. For example, a portable box table may be affixed with carrying or towing straps.

What is claimed is:

1. A portable box table, comprising:
a storage body comprising a plurality of sides enclosing a space suitable for storing items therein; and
a wheel assembly coupled to the storage body suitable for enabling transportation of the portable box table over a ground surface, wherein a side of the storage body is configured to be detachable from the storage body, wherein the detachable side further comprises extendable legs coupled to an underneath surface of the detachable side, wherein the extendable legs are configured to retract in a storage position parallel and adjacent to the underneath surface of the detachable side, and wherein the extendable legs are configured to extend from the storage position to an extended position to support a work surface of the detachable side in a position substantially parallel to the ground surface, wherein the detachable side is configured to be supported by the extendable legs to provide the work surface in a configuration separated from the storage body.

2. The portable box table as recited in claim 1, wherein the detachable side is suitable to provide the work surface for operation as a table surface when in the extended position.

3. The portable box table as recited in claim 1, wherein the detachable side is configured as a door for enabling access into the storage space of the storage body when the detachable side is coupled to the portable box table and configured in its storage position with its extendable legs retracted.

4. The portable box table as recited in claim 3, further comprising a table surface coupled to the portable box table in a pivoting configuration, wherein the table surface comprises:

a hinged mechanism configured to enable the table surface to pivot between retracted and extended positions, wherein the retracted position the table surface is parallel and adjacent to another side of the storage body, and wherein the extended position the table surface is extended away from the another side into a substantially horizontal position for use as a table; and a table leg hingeably coupled to an underneath side of the table surface, wherein when the table surface is in its retracted position, the table leg is retracted to be parallel and adjacent to the underneath side of the table surface, and also adjacent to the another side of the storage body, and wherein when the table surface is in its extended position, the table leg is pivoted away from the underneath side to be substantially perpendicular to the underneath side for support of the table surface upon the ground surface.

5. The portable box table as recited in claim 3, wherein the wheel assembly further comprises a pair of wheel tabs each having a plurality of pairs of axle holes in a configuration to enable adjustment of a relative distance of wheels to the storage body between at least first and second different relative positions.

6. The portable box table as recited in claim 1, wherein the detachable side is configured to be coupled to the portable box table by one or more hinges, wherein the one or more hinges are each configured with male and female parts that are separable by manually lifting the detachable side so that the male and female parts of the one or more hinges uncouple from each other.

7. The portable box table as recited in claim 6, wherein the male part of the one or more hinges is attached to the door, and wherein the female part of the one or more hinges is attached to the portable box table, wherein when the door is detached from the portable box table, the male part of the one or more hinges remains attached to the door, and the female part of the one or more hinges remains attached to the portable box table, wherein when the door is coupled to the portable box table, the door is capable of opening and closing in a door-like manner by a pivoting of the female part on the male part.

8. The portable box table as recited in claim 6, wherein the male part of the one or more hinges is attached to the portable box table, and wherein the female part of the one or more hinges is attached to the detachable side.

9. The portable box table as recited in claim 8, wherein when the detachable side is detached from the portable box table, the male part of the one or more hinges remains attached to the portable box table, and the female part of the one or more hinges remains attached to the detachable side, wherein when the detachable side is coupled to the portable box table, the detachable side is capable of opening and closing in a door-like manner by a pivoting of the female part on the male part.

10. The portable box table as recited in claim 1 further comprising a table surface coupled to the portable box table in a pivoting configuration, wherein the table surface comprises:

a hinged mechanism configured to enable the table surface to pivot between retracted and extended positions, wherein the retracted position the table surface is parallel and adjacent to another side of the storage body, and wherein the extended position the table surface is extended away from the another side into a substantially horizontal position for use as a table; and a table leg hingeably coupled to an underneath side of the table surface, wherein when the table surface is in its retracted position, the table leg is retracted to be parallel and adjacent to the underneath side of the table surface, and also adjacent to the another side of the storage body, and wherein when the table surface is in its extended position, the table leg is pivoted away from the underneath side to be substantially perpendicular to the underneath side for support of the table surface upon the ground surface.

11. The portable box table as recited in claim 1, wherein the detachable side is configured with a sufficient number of the extendable legs to support the work surface of the detachable side in the position substantially parallel to the ground surface in a stand-alone manner separate from the storage body.

12. The portable box table as recited in claim 11, wherein the detachable side is configured with at least two of the extendable legs that are physically separate from each other and each configured to separately extend and retract relative to an underneath surface of the detachable side.

13. The portable box table as recited in claim 1, wherein the detachable side is configured to be supported by the extendable legs to provide the work surface when the detachable side is detached from the storage body.

14. The portable box table as recited in claim 1, wherein the detachable side is configured to be coupled to the portable box table by one or more hinges, wherein the one or more hinges are each configured with male and female parts that are separable by manually lifting the detachable side so that the male and female parts of the one or more hinges uncouple from each other.

15. The portable box table as recited in claim 14, wherein the male part of the one or more hinges is attached to the portable box table, and wherein the female part of the one or more hinges is attached to the detachable side, wherein when the detachable side is detached from the portable box table, the male part of the one or more hinges remains attached to the portable box table, and the female part of the one or more hinges remains attached to the detachable side, wherein when the detachable side is coupled to the portable box table, the detachable side is capable of opening and closing in a door-like manner by a pivoting of the female part on the male part.

16. A portable box table, comprising:

a storage body comprising a plurality of sides enclosing a space suitable for storing items therein; and a wheel assembly coupled to the storage body suitable for enabling transportation of the portable box table over a ground surface, wherein a side of the storage body is configured to be detachable from the storage body, wherein the detachable side further comprises extendable legs coupled to an underneath surface of the detachable side, wherein the extendable legs are configured to retract in a storage position parallel and adjacent to the underneath surface of the detachable side, and wherein the extendable legs are configured to extend from the storage position to an extended position to support a work surface of the detachable side in a position substantially parallel to the ground surface, wherein the wheel assembly further comprises a pair of wheel tabs having a plurality of pairs of axle holes in a configuration to enable adjustment of a relative distance of wheels to the storage body between at least first and second different relative positions.

17. A portable box table, comprising:

a storage body comprising a plurality of sides enclosing a space suitable for storing items therein; and a wheel assembly coupled to the storage body suitable for enabling transportation of the portable box table over a ground surface, wherein a side of the storage body is configured to be detachable from the storage body, wherein the detachable side further comprises extendable legs coupled to an underneath surface of the detachable side, wherein the extendable legs are configured to retract in a storage position parallel and adjacent to the underneath surface of the detachable side, and wherein the extendable legs are configured to extend from the storage position to an extended position to support a work surface of the detachable side in a position substantially parallel to the ground surface, wherein the wheel assembly further comprises an axle assembly configured to pivot from a first position parallel to a back side of the storage body to a second position angled away from the back side.

18. A portable box table, comprising:

a storage body comprising a plurality of sides enclosing a space suitable for storing items therein;

a wheel assembly coupled to the storage body suitable for enabling transportation of the portable box table over a ground surface, wherein a side of the storage body is configured to be detachable from the storage body, wherein the detachable side further comprises extendable legs coupled to an underneath surface of the detachable side, wherein the extendable legs are configured to retract in a storage position parallel and adjacent to the underneath surface of the detachable side, and wherein the extendable legs are configured to extend from the storage position to an extended position to support a work surface of the detachable side in a position substantially parallel to the ground surface; and a steering assembly with a steering handle connected to a steerable wheel, wherein the steering assembly is configured to attach to an extendable frame member of the portable box table when the portable box table is laid on its back side so that it rests upon the ground surface upon wheels of the wheel assembly and the steerable wheel.

19. The portable box table as recited in claim 18, further comprising a seat configured to attach to the portable box table to enable a person to sit while steering with the steering assembly.

\* \* \* \* \*